US012291093B2

(12) United States Patent
Laroche et al.

(10) Patent No.: US 12,291,093 B2
(45) Date of Patent: May 6, 2025

(54) OFF-ROAD VEHICLE AIR INTAKE SYSTEM

(71) Applicant: BOMBARDIER RECREATIONAL PRODUCTS INC., Valcourt (CA)

(72) Inventors: David Laroche, Sherbrooke (CA); Mathieu Duquette, Sherbrooke (CA); Pierre Poulin, Sherbrooke (CA); Daniel Nadeau, St-Denis-de-Brompton (CA); Mathieu Hamel-Gagnon, Sherbrooke (CA); Olivier Coulombe, St-Denis-de-Brompton (CA); Jeremy Varlet, Le Mesnil-en-Thelle (FR); Stephane Veillette, Sainte-Genevieve-de-Batiscan (CA); Alexei Mikhailov, Bromont (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 18/210,176

(22) Filed: Jun. 15, 2023

(65) Prior Publication Data

US 2023/0406093 A1 Dec. 21, 2023

Related U.S. Application Data

(60) Provisional application No. 63/352,400, filed on Jun. 15, 2022.

(51) Int. Cl.
*B60K 13/02* (2006.01)
*B60N 2/80* (2018.01)
(Continued)

(52) U.S. Cl.
CPC .............. *B60K 13/02* (2013.01); *B60N 2/80* (2018.02); *B60Y 2200/20* (2013.01); *B62D 25/06* (2013.01); *F02M 35/162* (2013.01)

(58) Field of Classification Search
CPC .............. B60K 13/02; F02M 35/162; F02M 35/10144; B60N 2/80; B60N 2/01;
(Continued)

(56) References Cited

U.S. PATENT DOCUMENTS 2,232,108 A * 2/1941 Giacomini ............... B60H 1/30
454/157
4,192,216 A 3/1980 Wait
(Continued)

FOREIGN PATENT DOCUMENTS

RU 155541 U1 10/2015
RU 2637139 C1 11/2017
(Continued)

OTHER PUBLICATIONS

Search Report issued from the Eurasian Patent Office in connection with the corresponding Patent Application No. 202391491 and mailed on Nov. 3, 2023.

*Primary Examiner* — Syed O Hasan
(74) *Attorney, Agent, or Firm* — BCF LLP

(57) ABSTRACT

An off-road vehicle has: a frame including a rollover protection structure; two front wheels operatively connected to the frame; two rear wheels operatively connected to the frame; at least one seat supported by the frame; an internal combustion engine supported by the frame, being disposed rearward of the at least one seat, and being operatively connected at least one of: the two rear wheels, and the two front wheels; an engine air intake system fluidly connected to the engine for supplying air to the engine; and an air intake conduit having a conduit inlet and a conduit outlet, the conduit outlet being fluidly connected to the engine air intake system for supplying air to the engine air intake system, the conduit inlet being disposed at least in part vertically higher than the rollover protection structure.

11 Claims, 22 Drawing Sheets

(51) Int. Cl.
*B62D 25/06* (2006.01)
*F02M 35/16* (2006.01)

(58) Field of Classification Search
CPC ....... B60J 1/04; B60J 1/14; B60J 1/007; B60J 1/06; B62D 25/06; B62D 21/03; B62D 65/024
See application file for complete search history.

(56) References Cited

U.S. PATENT DOCUMENTS

| | | | | |
|---|---|---|---|---|
| 4,212,659 | A | * | 7/1980 | Magrini ................. B01D 45/08 55/440 |
| 4,353,587 | A | * | 10/1982 | Brenholt .............. B62D 35/001 296/180.3 |
| 7,287,619 | B2 | | 10/2007 | Tanaka et al. |
| 9,932,073 | B2 | | 4/2018 | Dube et al. |
| 10,315,510 | B2 | | 6/2019 | Toupin et al. |
| 10,752,106 | B1 | * | 8/2020 | Freeman ................ B62D 65/16 |
| 11,391,361 | B2 | | 7/2022 | Leclair et al. |

FOREIGN PATENT DOCUMENTS

| | | |
|---|---|---|
| RU | 2730802 C2 | 8/2020 |
| RU | 2735192 C2 | 10/2020 |

\* cited by examiner

OFF-ROAD VEHICLE AIR INTAKE SYSTEM

CROSS-REFERENCE

The present application claims priority to U.S. Provisional Patent Application No. 63/352,400, filed Jun. 15, 2023, the entirety of which is incorporated herein by reference.

FIELD OF TECHNOLOGY

The present technology relates to air intake systems for off-road vehicles and off-road vehicles having such air intake systems.

BACKGROUND

There exists various types of vehicles used mainly in off-road conditions. One such type is the side-by-side off-road vehicle (SSV). The name "side-by-side" refers to the seating arrangement of the vehicle in which the driver and a passenger are seated side-by-side. Some side-by-side off-road vehicles also have a second row of seats to accommodate one or more additional passengers. These vehicles typically have an open cockpit, a roll cage and a steering wheel.

As would be understood, in order to operate, the internal combustion engine of a SSV needs to be supplied with air. This air needs to be as free as possible of dust, debris and water, otherwise the engine will not operate as efficiently as it could and there is also a risk of damaging the engine. Since SSVs operate in off-road conditions, the environment in which they operate tends to be dustier, to have more debris and to be wetter than the environment in which on-road vehicles typically operate. The off-road environment therefore makes the desired supply of fresh air to the engine difficult.

Also, many components of the SSV can get hot during operation. As such, it is desirable to cool these components. One way of cooling these components is to supply air to these components. Another way of cooling these components is to circulate a liquid over these components. This liquid then needs to be cooled with a heat exchanger over which air flows to improve cooling. However, the air flowing over the components to be air cooled (i.e. heat exchangers or other components to be air cooled) should also be as free as possible of dust, debris and water. As discussed above, the off-road environment in which SSVs operate makes this difficult.

Furthermore, side-by-side off-road vehicles are generally narrower and shorter than on-road vehicles such as cars. As such, there is less space available to dispose the various components that would be needed to supply clean air to the engine and to the components that would be needed to supply clean air to the CVT.

As mentioned above, side-by-side off-road vehicles are typically open cockpit vehicles, but owners of such vehicles sometimes decide to add a windshield to protect them from wind and dust. However, the protection from the wind provided by the windshield can also negatively affect the supply of air to an air intake system of the vehicle.

Thus there is a desire for an arrangement of components for supplying air to the engine and other components of an off-road vehicle that is suitable for the operating conditions and limited overall dimensions of side-by-side off-road vehicles, and that addresses the issues associated with air supply when a windshield is provided.

SUMMARY

It is an object of the present technology to ameliorate at least some of the inconveniences present in the prior art.

According to one aspect of the present technology, there is provided an off-road vehicle having: a frame including a rollover protection structure; two front wheels operatively connected to the frame; two rear wheels operatively connected to the frame; at least one seat supported by the frame; an internal combustion engine supported by the frame, being disposed rearward of the at least one seat, and being operatively connected at least one of: the two rear wheels, and the two front wheels; an engine air intake system fluidly connected to the engine for supplying air to the engine; and an air intake conduit having a conduit inlet and a conduit outlet, the conduit outlet being fluidly connected to the engine air intake system for supplying air to the engine air intake system, the conduit inlet being disposed at least in part vertically higher than the rollover protection structure.

According to some embodiments of the present technology, the conduit inlet faces generally forwardly.

According to some embodiments of the present technology, the conduit inlet is disposed forward of a backrest of the at least one seat.

According to some embodiments of the present technology, the air intake conduit is generally L-shaped. A first portion of the air intake conduit extends generally horizontally rearward from the conduit inlet. A second portion of the air conduit extend generally upward from the conduit outlet.

According to some embodiments of the present technology, the second portion is disposed at least in part rearward of the backrest of the at least one seat.

According to some embodiments of the present technology, a windshield is connected to the frame forward of the at least one seat.

According to some embodiments of the present technology, a roof is connected to the rollover protection structure.

According to some embodiments of the present technology, a portion of the air intake conduit is vertically higher than the roof.

According to some embodiments of the present technology, the roof defines a bottom of a section of the air intake conduit comprising the portion of the air intake conduit that is vertically higher than the roof.

According to some embodiments of the present technology, a rear cargo platform connected to the frame and being disposed rearward of the at least one seat. The air intake conduit is disposed forward of the rear cargo platform.

According to some embodiments of the present technology, a plenum is disposed rearward of the at least one seat. An inlet of the engine air intake system is disposed in the plenum for supplying air from the plenum to the engine. The conduit outlet is fluidly connected to the plenum for supplying air to the engine air intake system.

According to some embodiments of the present technology, the conduit outlet is disposed above the plenum.

According to some embodiments of the present technology, a heat exchanger is supported by the frame. An air deflector is disposed at least in part in the plenum. A portion of air supplied from the conduit outlet to the plenum is deflected by the air deflector toward the heat exchanger According to some embodiments of the present technology, the plenum is laterally centered on the vehicle.

According to some embodiments of the present technology, the engine is disposed under the plenum.

According to some embodiments of the present technology, the at least one seat is two seats disposed side-by-side.

Each of the two seats has a headrest. The air intake conduit is disposed laterally between the headrests.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application. In the event of a discrepancy between an explanation in the present application and an explanation in a document incorporated herein by reference, the explanation in the present application takes precedence.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
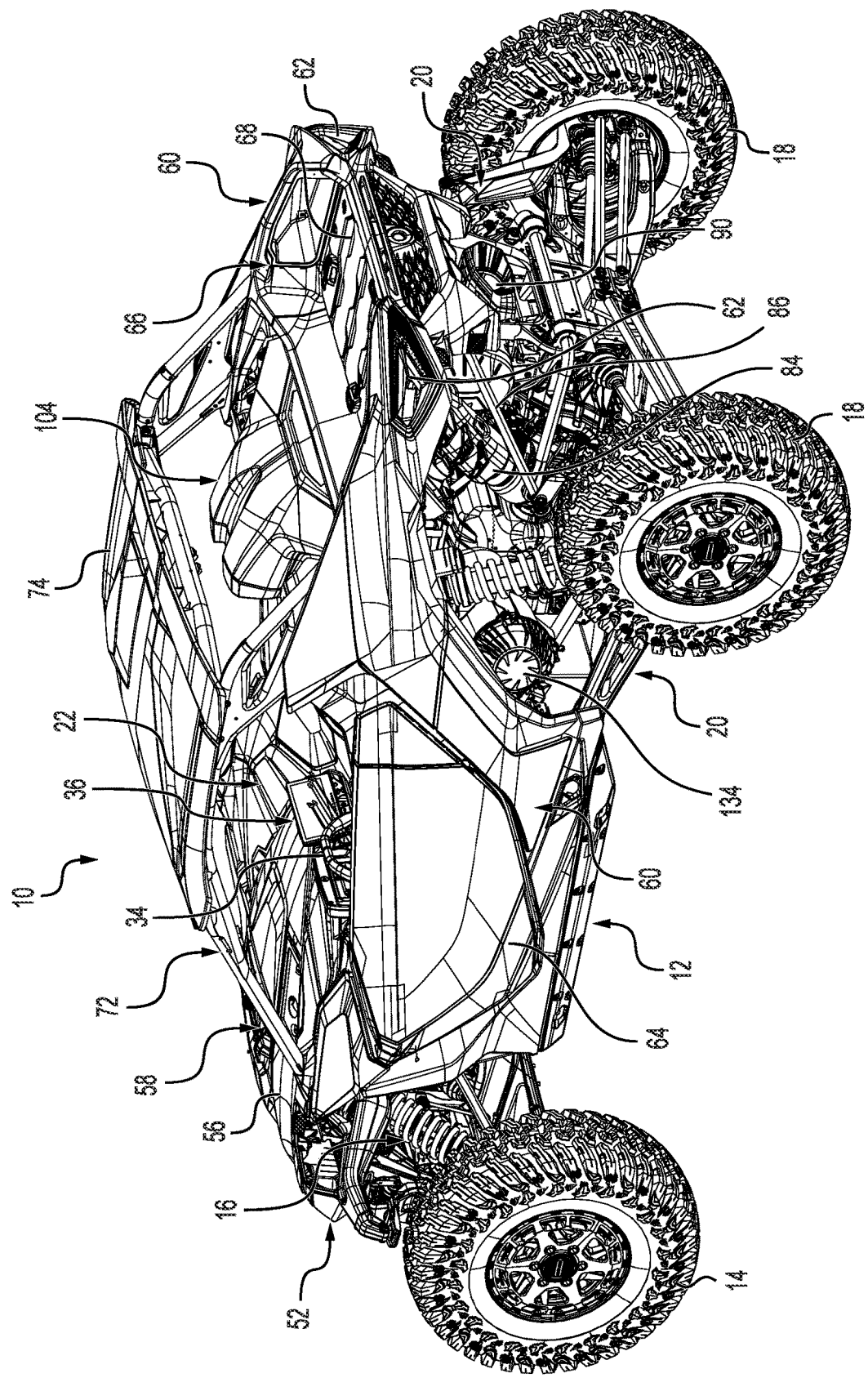
FIG. 1 is a perspective view taken from a rear, left side of a side-by-side off-road vehicle.

The present technology will be described with respect to a four-wheel off-road vehicle having two side-by-side seats 24, 26 and a steering wheel 34. However, it is contemplated that some aspects of the present technology may apply to other types of vehicles such as, but not limited to, off-road vehicles having more or less than four wheels.

The general features of the off-road vehicle 10 will be described with respect to FIGS. 1, 12 to 14, 18 and 19. The vehicle 10 has a frame 12, two front wheels 14 connected to a front of the frame 12 by front suspension assemblies 16 and two rear wheels 18 connected to the frame 12 by rear suspension assemblies 20.

The frame 12 defines a central cockpit area 22 inside which are disposed a driver seat 24 and a passenger seat 26. The seats 24, 26 are disposed side-by-side. In the present embodiment, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10. Each seat 24, 26 has a seat bottom 28 (FIG. 18), a backrest 30 and a headrest 32. It is contemplated that in some embodiments, the seats 24, 26 could be replaced by a bench seat with two or more seating positions or by other types of seats.

A steering wheel 34 is disposed in front of the driver seat 24. The steering wheel 34 is used to turn the front wheels 14 to steer the vehicle 10. Various displays and gauges 36 are provided in the cockpit area 22 to provide information to the driver regarding the operating conditions of the vehicle 10. Examples of displays and gauges 36 include, but are not limited to, a speedometer, a tachometer, a fuel gauge, a transmission position display, and an oil temperature gauge.

Figure 13:
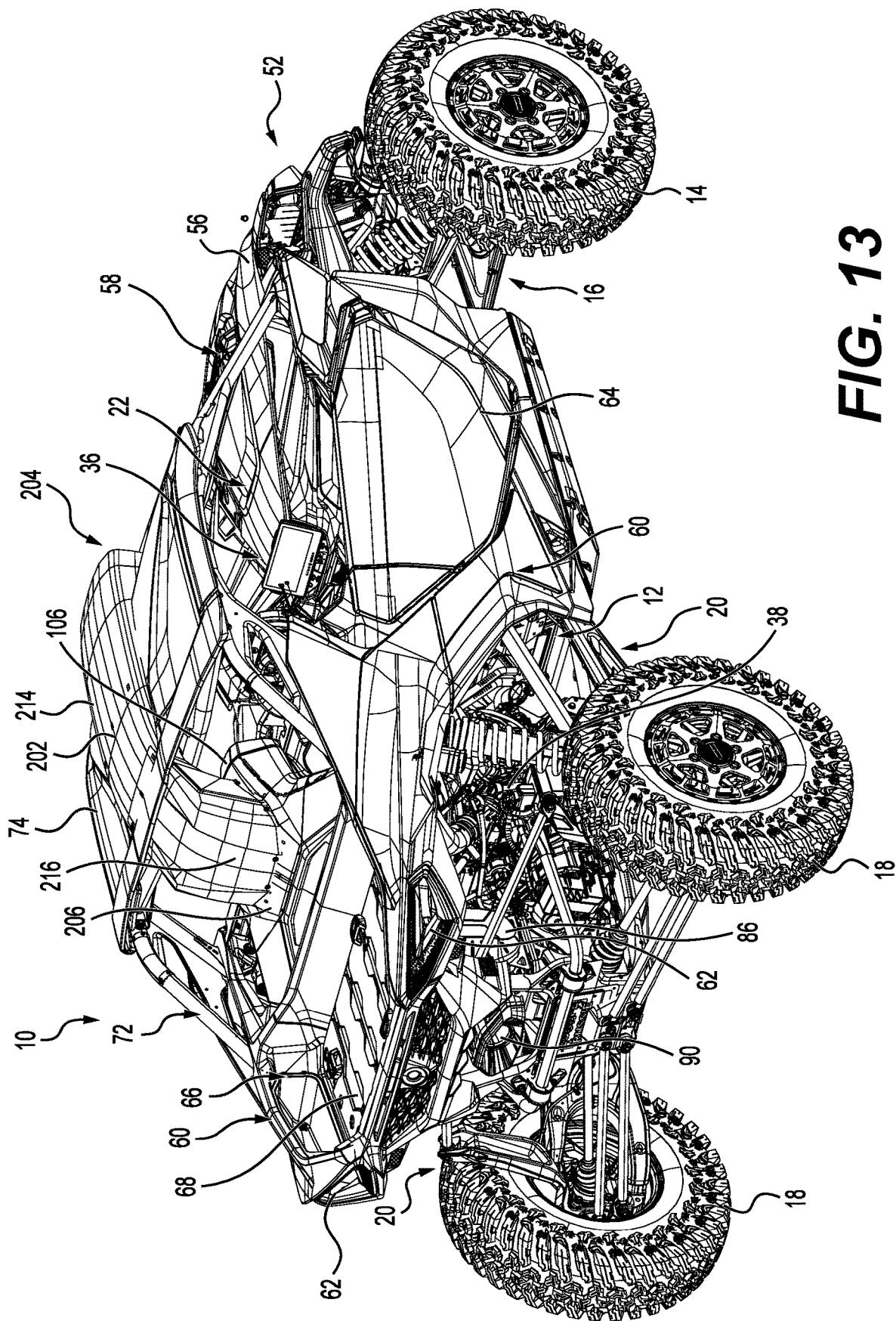
FIG. 13 is a perspective view taken from a rear, right side of the vehicle of FIG. 12.
Figure 14:
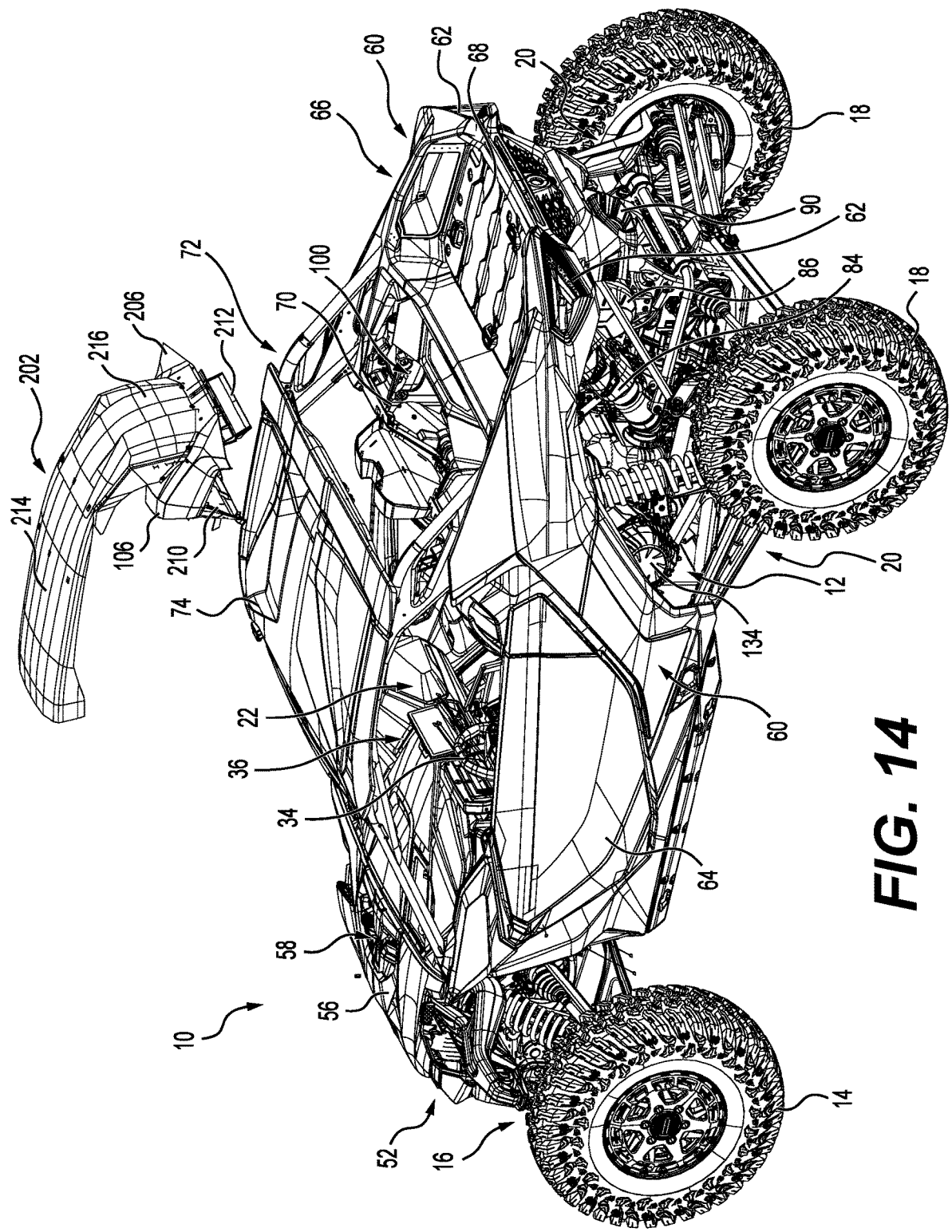
FIG. 14 is a perspective view taken from a rear, left side of the vehicle of FIG. 12 with the air intake conduit shown removed from the vehicle.

As can be seen in FIG. 13, an internal combustion engine 38 is connected to and supported by the frame 12 in a rear portion of the vehicle 10. The engine 38 is disposed rearward of the seat 24, 26. In the present embodiment, the engine 38 is an inline, three-cylinder, four-stroke engine. It is contemplate that other types of internal combustion engines could be used such as, but not limited to, engines having more or less cylinders, V-type engines, two-stroke engines and diesel engines. As best see in FIGS. 10 and 11, the engine 38 is operatively connected to a dual-clutch transmission (DCT)

40 disposed behind the engine 38. It is contemplated that in other embodiments, other types of automatic, semi-automatic or manual transmissions could be used instead to the DCT 40. The DCT 40 is operatively connected to a transaxle 50 (FIGS. 10 and 11) to transmit torque from the engine 38 to the transaxle 50. The transaxle 50 is disposed behind the DCT 40. The transaxle 50 is operatively connected to the rear wheels 18 to propel the vehicle 10. The DCT 40 is also operatively connected to a front differential (not shown). The front differential is operatively connected to the front wheels 14 to propel the vehicle 10. A fuel tank (not shown) is suspended from the frame 12 in front of the passenger seat 26 and stores the fuel to be used by the engine 38. In some embodiments, the vehicle 10 has an all-wheel drive mode where the engine 38 drives all the wheels 14, 18 and a two-wheel drive mode where the engine 38 drives only the rear wheels 18. It is contemplated that in some embodiments, the engine 38 could drive only the front wheels 14 or only the rear wheels 18.

Turning back to FIGS. 1, 12 to 14, 18 and 19, body panels of the vehicle 10 will be described. The body panels are connected to the frame 12. The panels help protect the internal components of the vehicle 10 and provide some of the aesthetic features of the vehicle 10. Front panels 52 are connected to a front of the frame 12. The front panels 52 are disposed forward of the front suspension assemblies 16 and laterally between the front wheels 14. The front panels 52 define two apertures inside which the headlights 54 of the vehicle 10 are disposed. A cover 56 extends generally horizontally reward from a top of the front panels 52. The cover 56 defines an aperture 58 through which tops of the front suspension assemblies 16 protrude. Side panels extend along the sides of the frame 12 Two of the side panels 60 define apertures at the rear thereof to receive the brake lights 62 of the vehicle 10. It is contemplated that the brake lights 62 could be replaced with reflectors or that reflectors could be provided in addition to the brake lights 62.

On each side of the vehicle 10, the side panels 60 define a passage through which a driver (or passenger depending on the side of the vehicle 10) can enter or exit the vehicle 10. Each side of the vehicle 10 is provided with a door 64 that selectively closes the corresponding passage. It is contemplated that the doors 64 could be omitted.

As seen in FIG. 1, at the rear of the vehicle 10, the side panels 60 define a cargo space 66 therebetween behind the seats 24, 26. The cargo space 66 has a rear cargo platform 68 extending horizontally between the side panels 60 and being connected to the frame 12.

Figure 2:
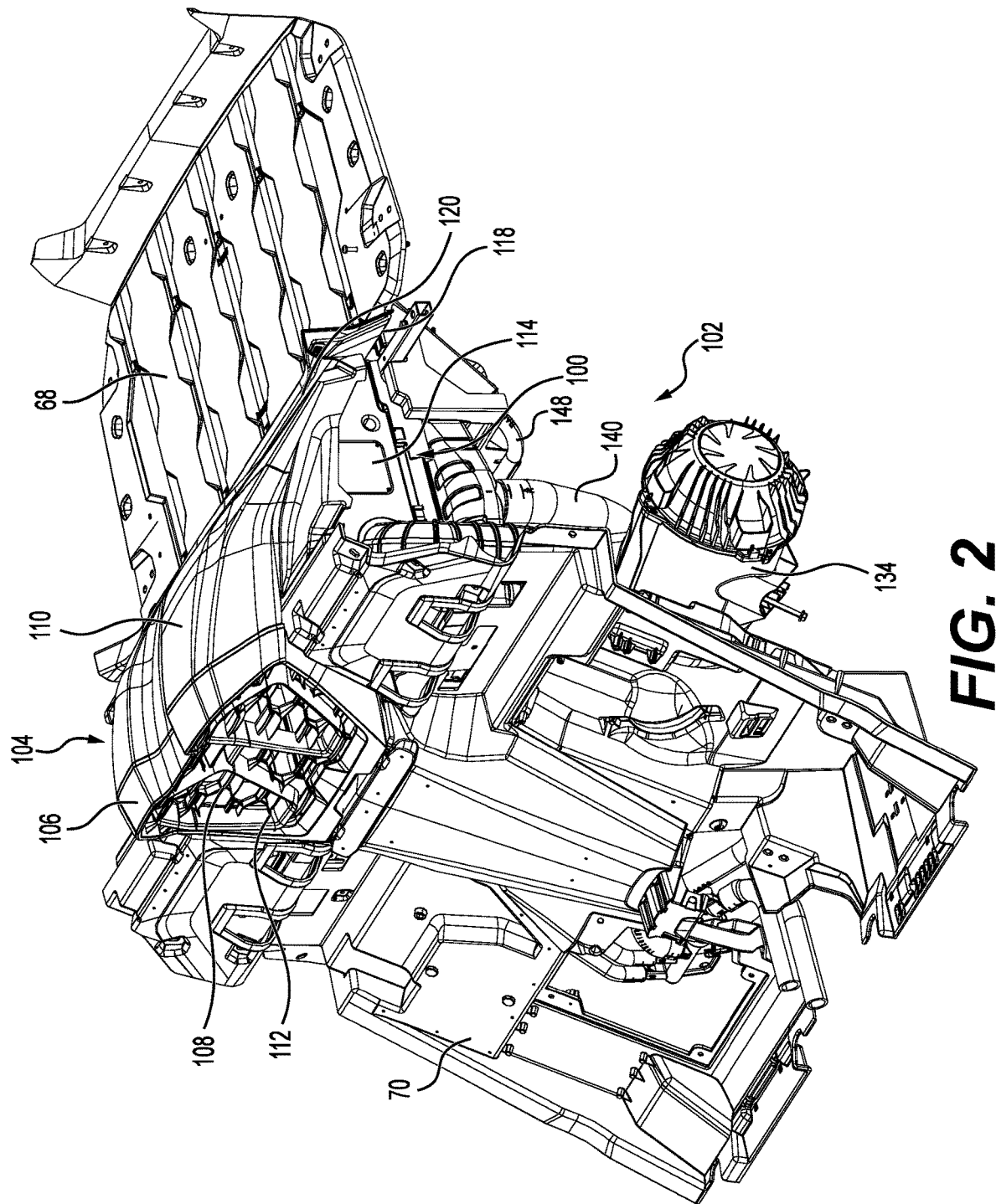
FIG. 2 is a perspective view taken from a front, left side of a portion of an air intake system, a cargo platform and a wall separating a cockpit area from an internal combustion engine of the vehicle of FIG. 1.
Figure 3:
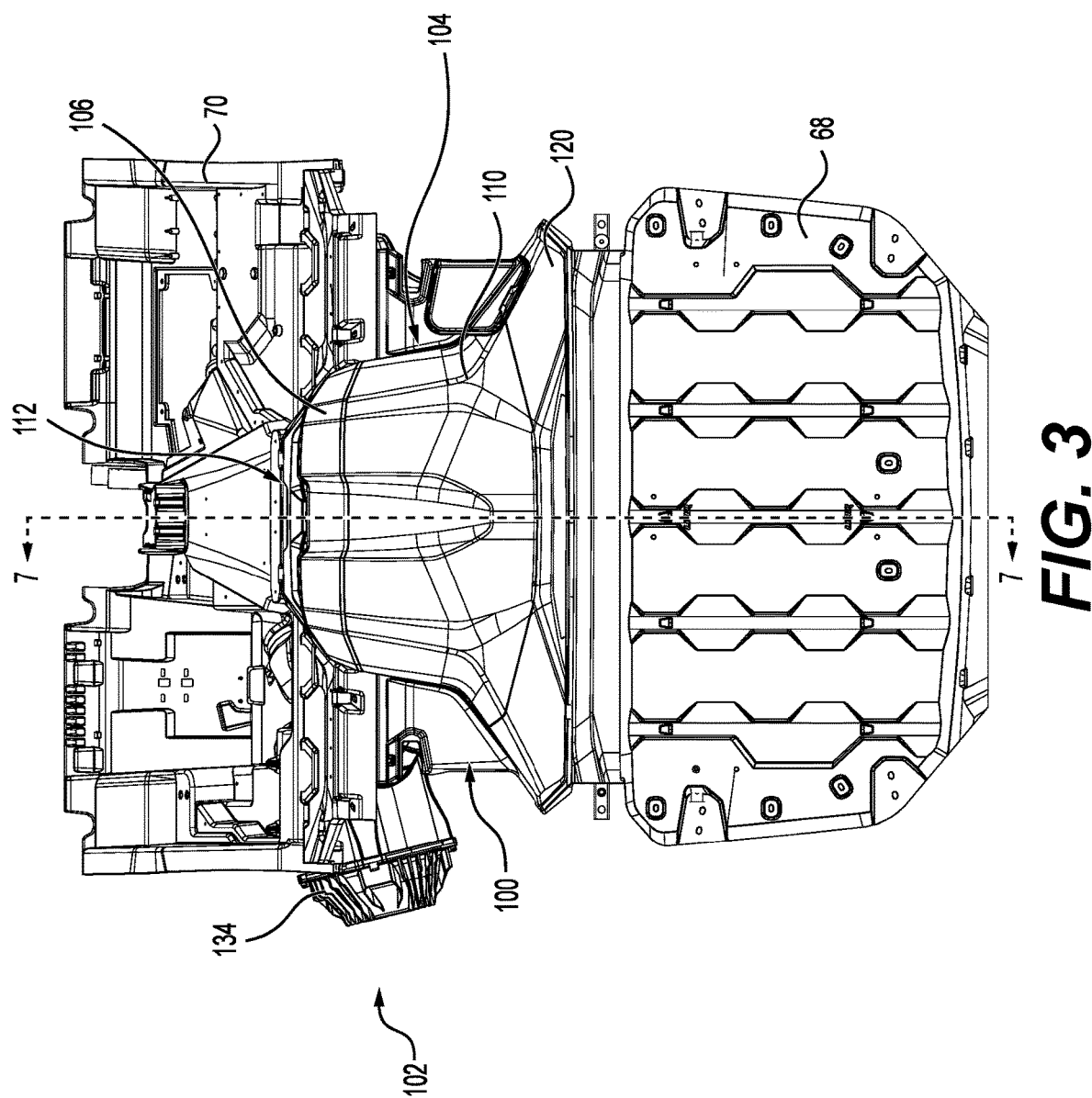
FIG. 3 is a top, plan view of the components of FIG. 2.
Figure 4:
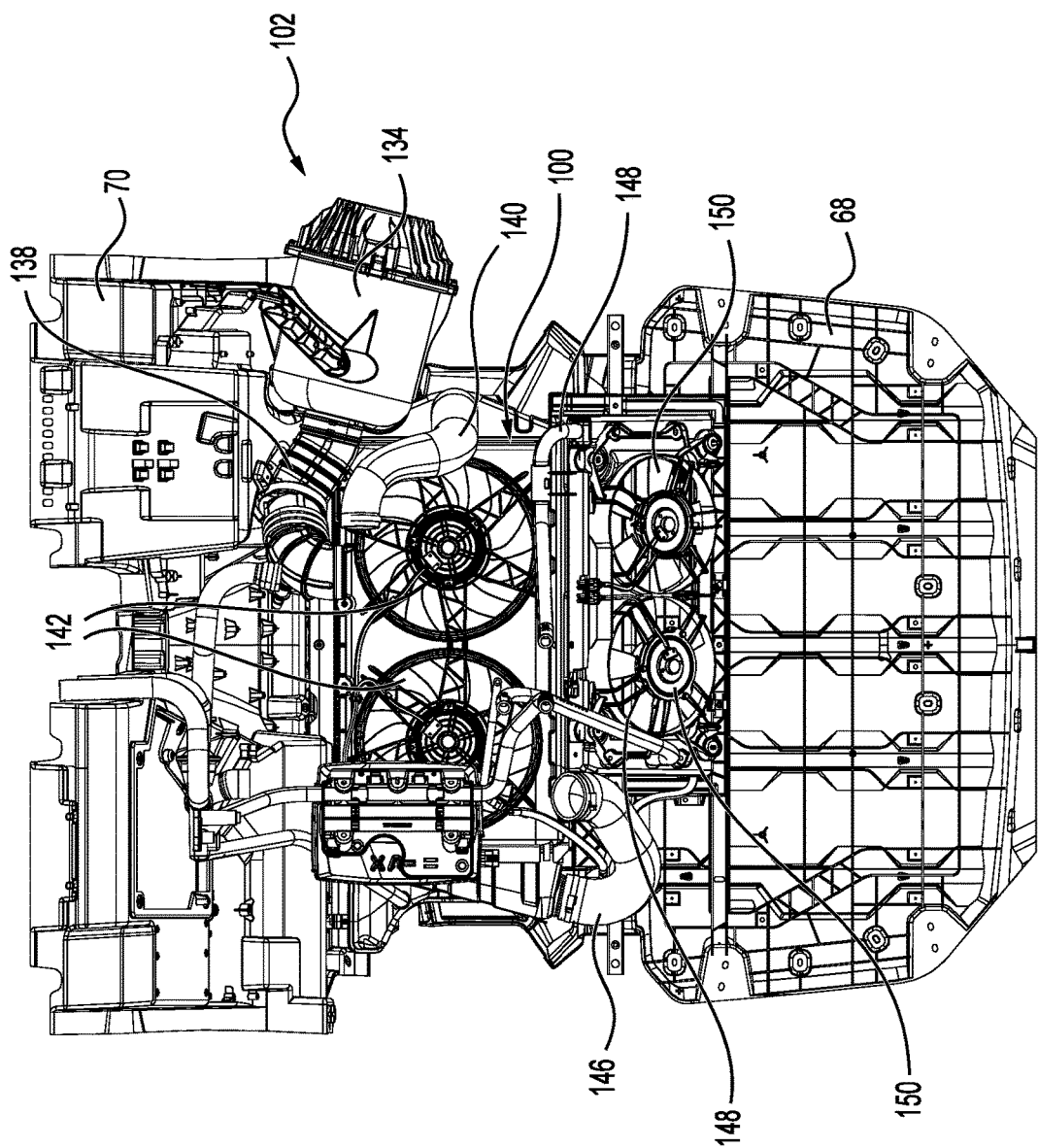
FIG. 4 is a bottom plan view of the components of FIG. 2.

A separation wall 70 (see FIGS. 2 and 10 for example) is connected to the frame 12, extends laterally and is disposed longitudinally between the seats 24, 26 and the rear cargo platform 68. The separation wall 70 is also disposed longitudinally between the seats 24, 25 and the engine 38. As such, the separation wall 70 separates the cockpit area 22 from the engine 38.

The frame 12 includes a rollover protection structure (ROPS) 72, also known as a roll cage. The ROPS 72 is disposed over the cockpit area 22. The ROPS 72 is made of a plurality of hollow steel tubes, but other materials are contemplated. In the present embodiment, a roof 74 is connected to the top of the ROPS 72 to provide shade to the passengers occupying the cockpit area 22 and to protect them from the elements such as rain. The roof 74 is a rigid roof, but it is contemplated that in some embodiment, the roof 74 could be made of flexible material such a fabric. It is contemplated that in some embodiments, the roof 74 could be omitted.

Figure 11:
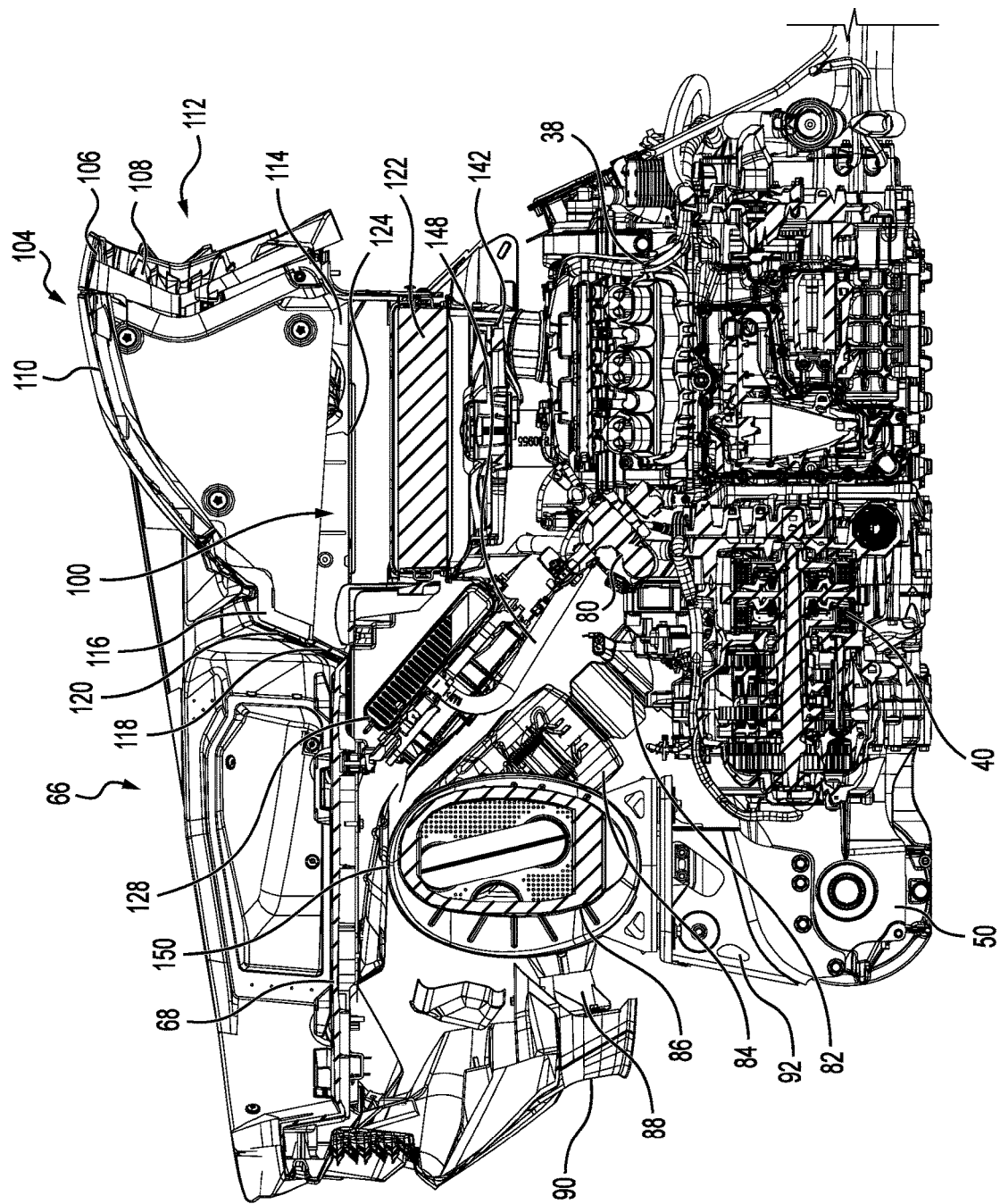
FIG. 11 is a longitudinal cross-section of the components of FIG. 10, with the engine radiator removed.
Figure 12:
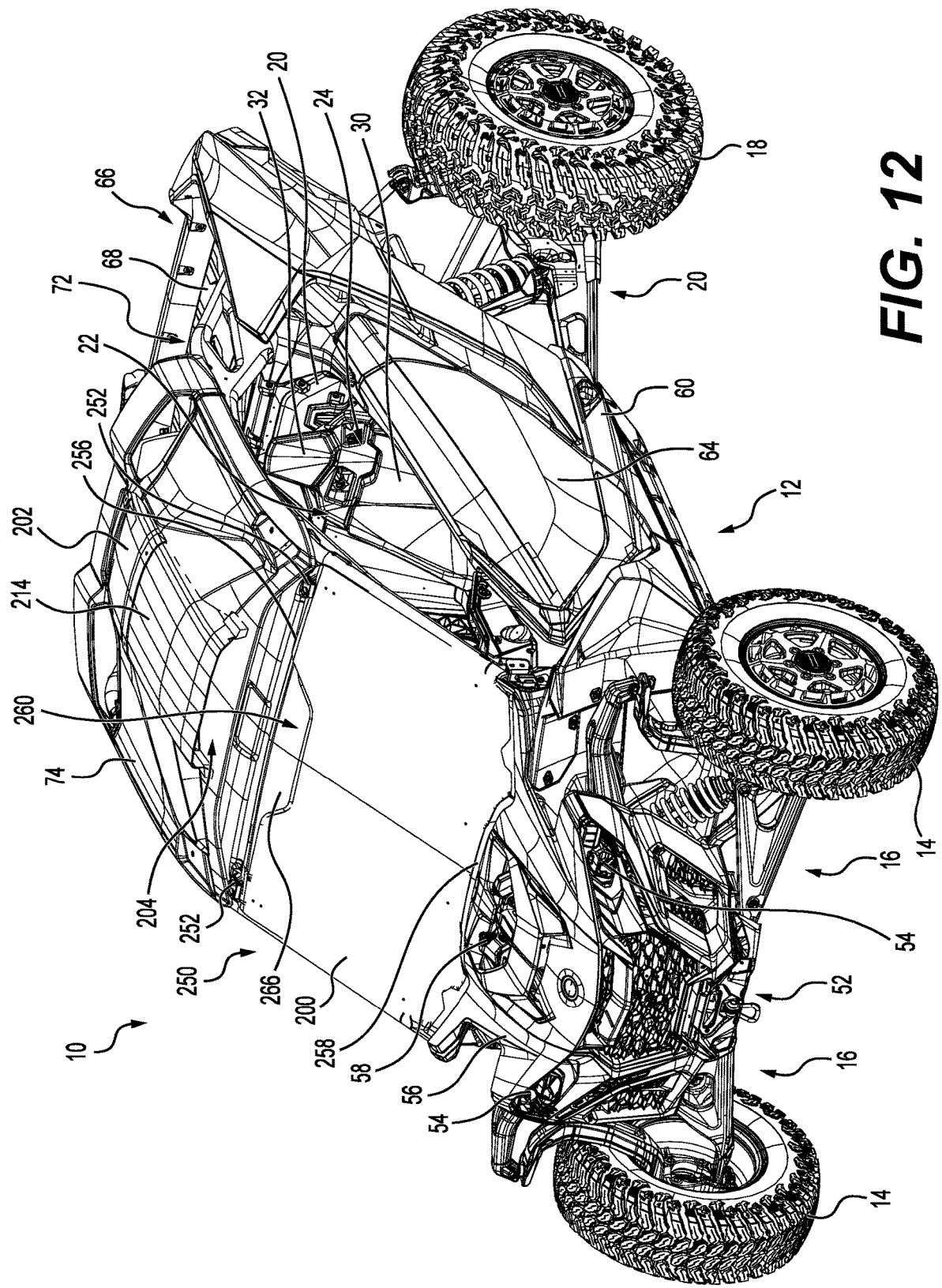
FIG. 12 is a perspective view taken from a front, left side of the vehicle of FIG. 1 provided with a windshield and an additional air intake conduit.

Turning now to FIG. 11, an engine exhaust system of the vehicle 10 will be described. Exhaust gases from the combustion chambers of the engine 38 enter the engine exhaust system via an exhaust manifold (not shown) connected to the cylinders of the engine 38. From the exhaust manifold, the exhaust gases flow to the turbocharger 80 to drive a turbine of the turbocharger 80. From the turbocharger 80, the exhaust gases flow in an exhaust pipe 82 that extends rearward. From the exhaust pipe 82, the exhaust gases flow rearward and upward through an expansion chamber 84. It is contemplated that the expansion chamber 84 could house a catalytic converter. From the expansion chamber 84, the exhaust gases flow into a muffler 86 extending laterally and being disposed below the rear cargo platform 68. From the muffler 86, the exhaust gases flow in an exhaust pipe 88 extending from the rear side of the muffler 86. The exhaust pipe 88 is laterally centered on the vehicle 10. The exhaust pipe 88 defines a rearward facing exhaust outlet 90 through which the exhaust gases flow to the atmosphere. The muffler 86 is connected to the transaxle 50 via brackets 92.

Turning now to FIGS. 2 to 11, an air intake system of the vehicle 10 will be described. The air intake system includes a plenum 100 and an engine air intake system 102. The plenum 100 defines a volume which receives air from the atmosphere and from which air is supplied to various components of the vehicle 10 as will be described in more detail below.

Figure 10:
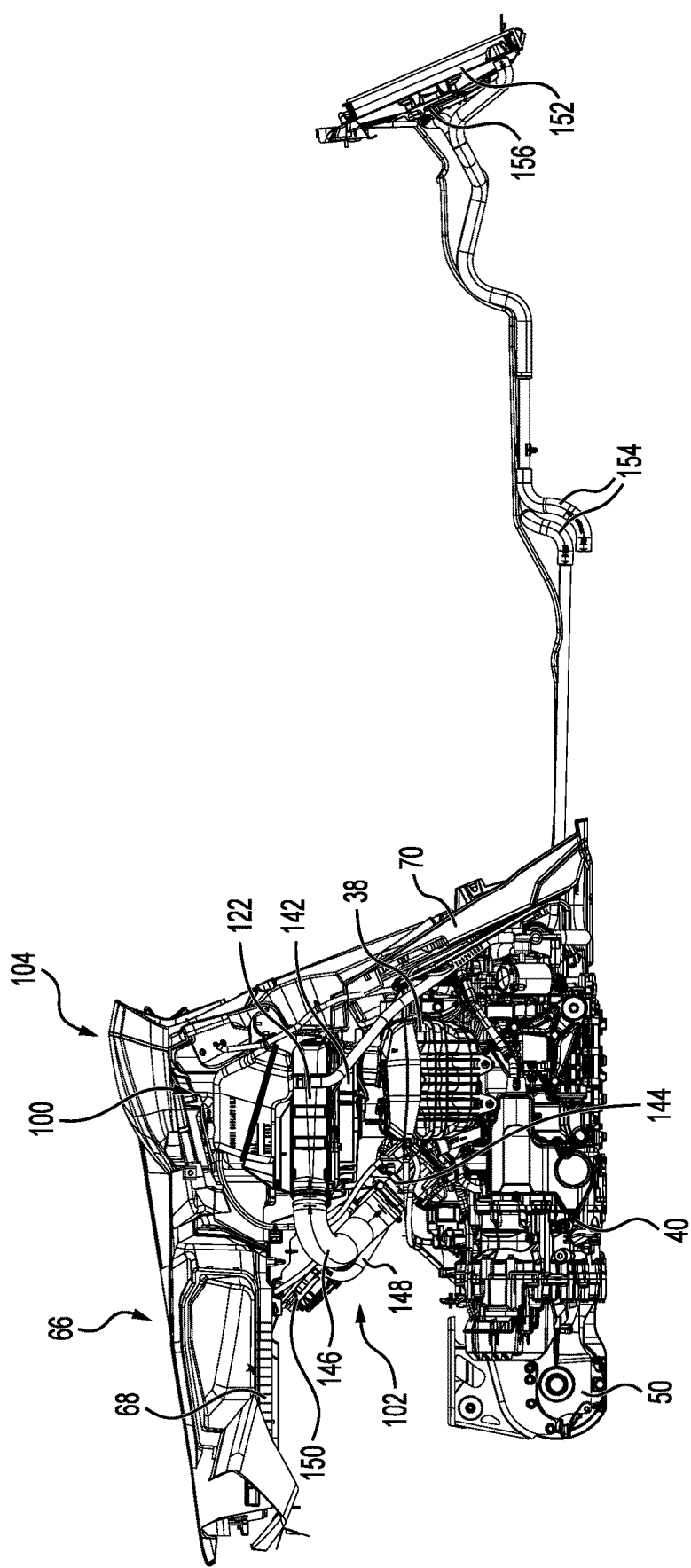
FIG. 10 is a right side elevation view of the components of FIG. 2, a power pack and an engine radiator of the vehicle of FIG. 1.

In the present embodiment, the plenum 100 disposed rearward of the seats 24, 26 and is laterally centered on the vehicle 10. As can be seen in FIGS. 10 and 11, the engine 38 disposed below the plenum 100. As such, the plenum 100 is vertically higher than the engine 38. Most of the plenum 100 is also vertically higher than the rear cargo platform 68.

A plenum air intake 104 for supplies air from the atmosphere to the plenum 100. The plenum air intake 104 includes a bezel 106, a grille 108 and a scoop 110. The bezel 106 defines an inlet 112 of the of the plenum air intake 104. The grille 108 is disposed in the inlet 112, inside the bezel 106. The grille 108 prevents large debris from entering the plenum 100. The scoop 110 is disposed above the plenum 100 for redirecting air entering the inlet 112 generally downward such that it is supplied to the plenum 100 via the top of the plenum 100.

Figure 19:
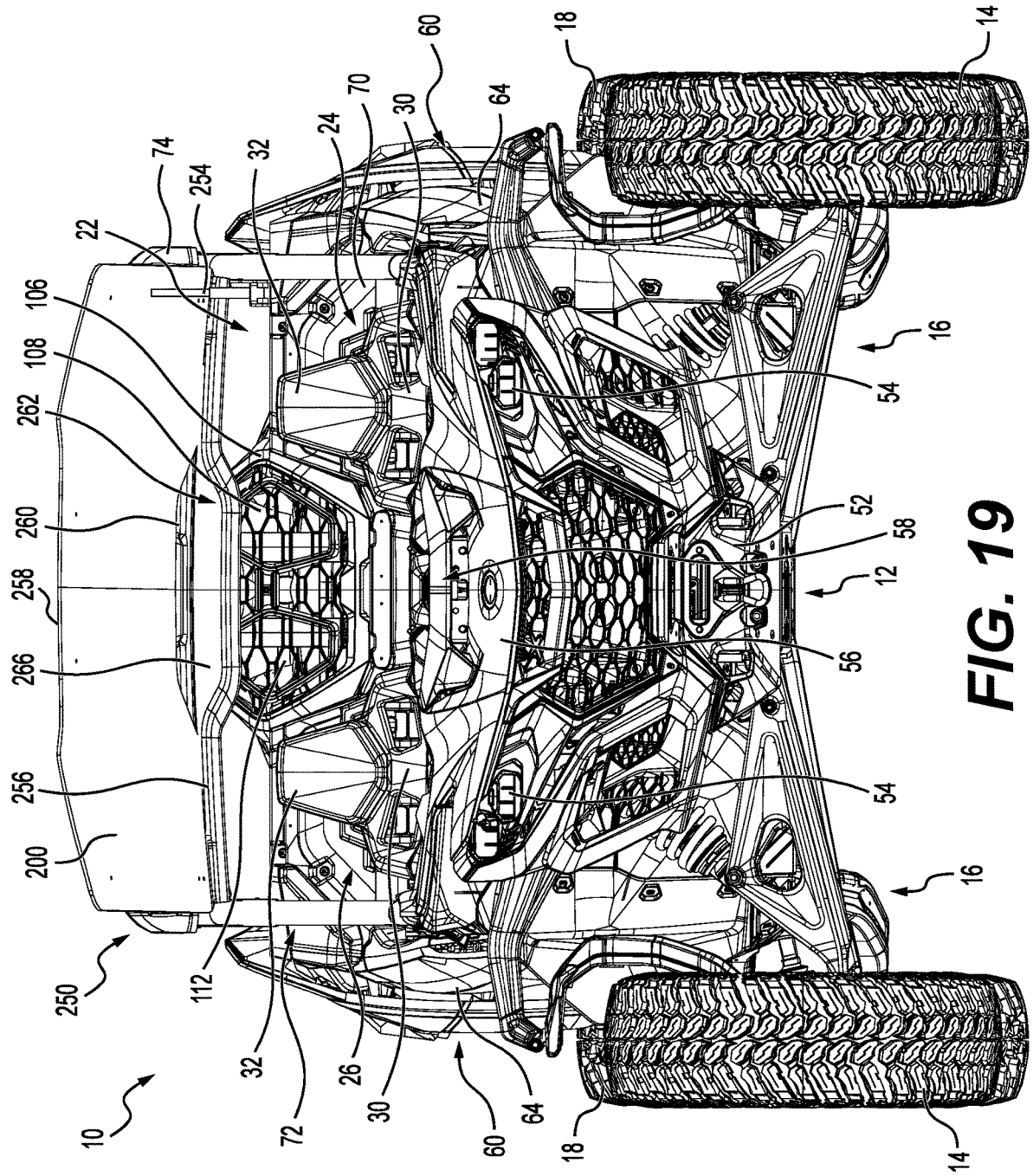
FIG. 19 is a front elevation view of the vehicle of FIG. 18.

In the present embodiment, the inlet 112 of the plenum air intake 104 faces generally forward. The plenum air intake 104 is laterally centered on the vehicle 10. As can be seen in FIG. 19, the plenum air intake 104 is disposed in part laterally between the headrests 32 of the seats 24, 26. The inlet 112 of the plenum air intake 104 is disposed vertically between than the cover 56 and the roof 74 and laterally between the headrests 32 of the seats 24, 26 such that air flowing through the cockpit area 22 can flow into the plenum 110 via the plenum 100. As would be understood, when the vehicle 10 is moving forward, the forward motion of the vehicle 10 causes air to be rammed into the plenum air intake 104.

As best seen in FIGS. 5 to 9, the plenum 100 has left and right plenum walls 114. A front of the plenum 100 is defined by the wall 70. A rear of the plenum 100 is defined by a rear plenum wall 116 and by a front wall 118 of the rear cargo platform 68. The plenum walls 114, 116 include acoustic dampening material. A cowl 120 is disposed over the left and right plenum walls 114, the rear plenum wall 116 and the front wall 118 of the rear cargo platform 68 to make the plenum 100 more aesthetically pleasing. A heat exchanger 122 that is supported by the frame 12 defines a bottom of the plenum 100. It is contemplated that the heat exchanger 122 could alternatively define another side of the plenum 100. Air from the plenum 100 flows over the heat exchanger 122 to cool a vehicle fluid flowing through the heat exchanger 122. The heat exchanger 122 will be described in more detail below. An L-shaped bracket 124 connect the rear of the heat exchanger 122 to a front of the rear cargo platform 68. The L-shaped bracket 124 defines two apertures 126. Another heat exchanger 128 is supported by the frame 12 below the rear cargo platform 68 and behind the heat exchanger 122. More specifically, the heat exchanger 128 is connected at an angle between the rear cargo platform 68 and the heat exchanger 122. Air from the plenum 100 flows through the apertures 126 and then over the heat exchanger 128 to cool a vehicle fluid flowing through the heat exchanger 128. The heat exchanger 128 will be described in more detail below.

Figure 5:
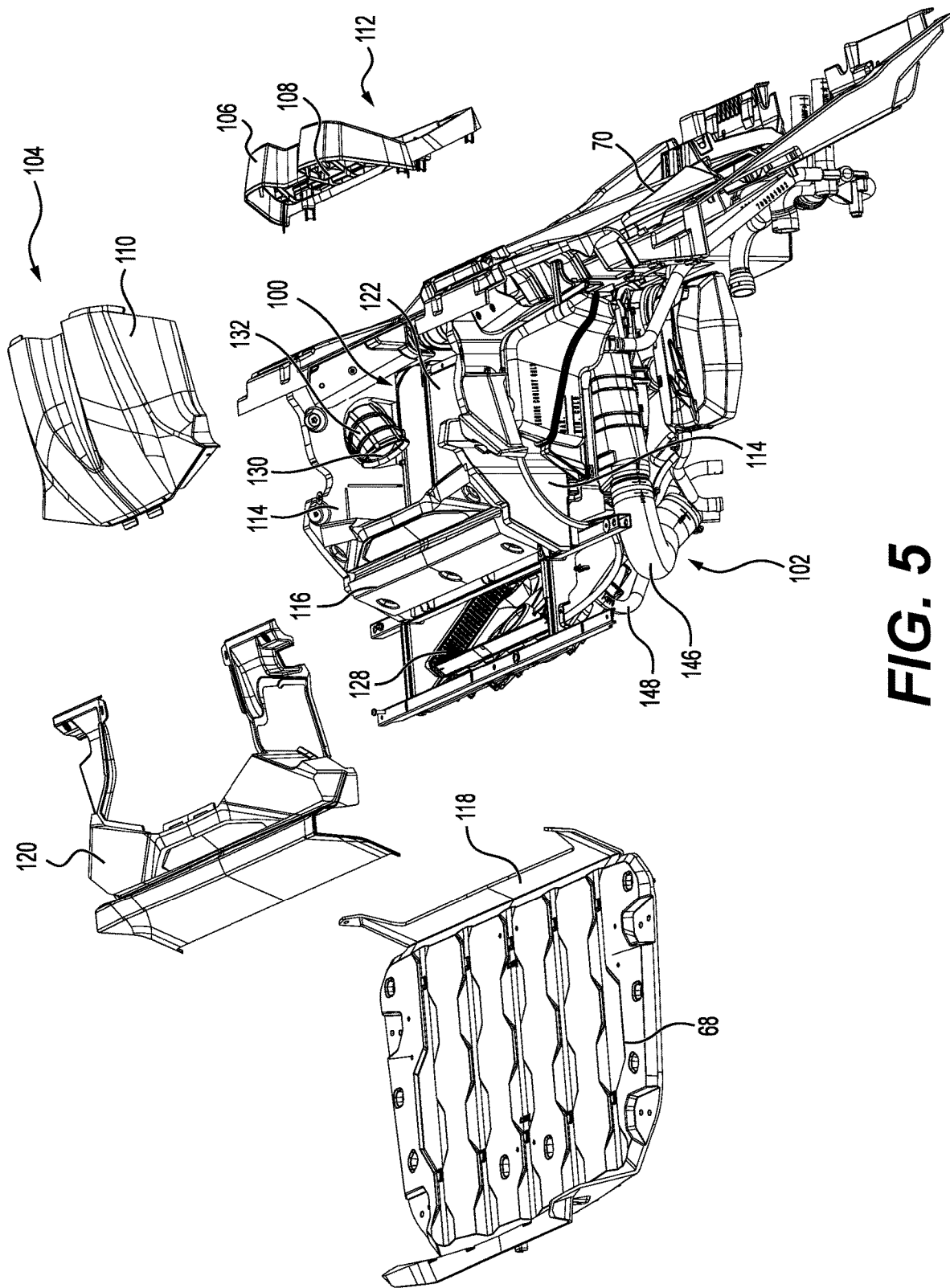
FIG. 5 is perspective view taken from a rear, right side of the components of FIG. 2 in a partially exploded configuration.
Figure 6:
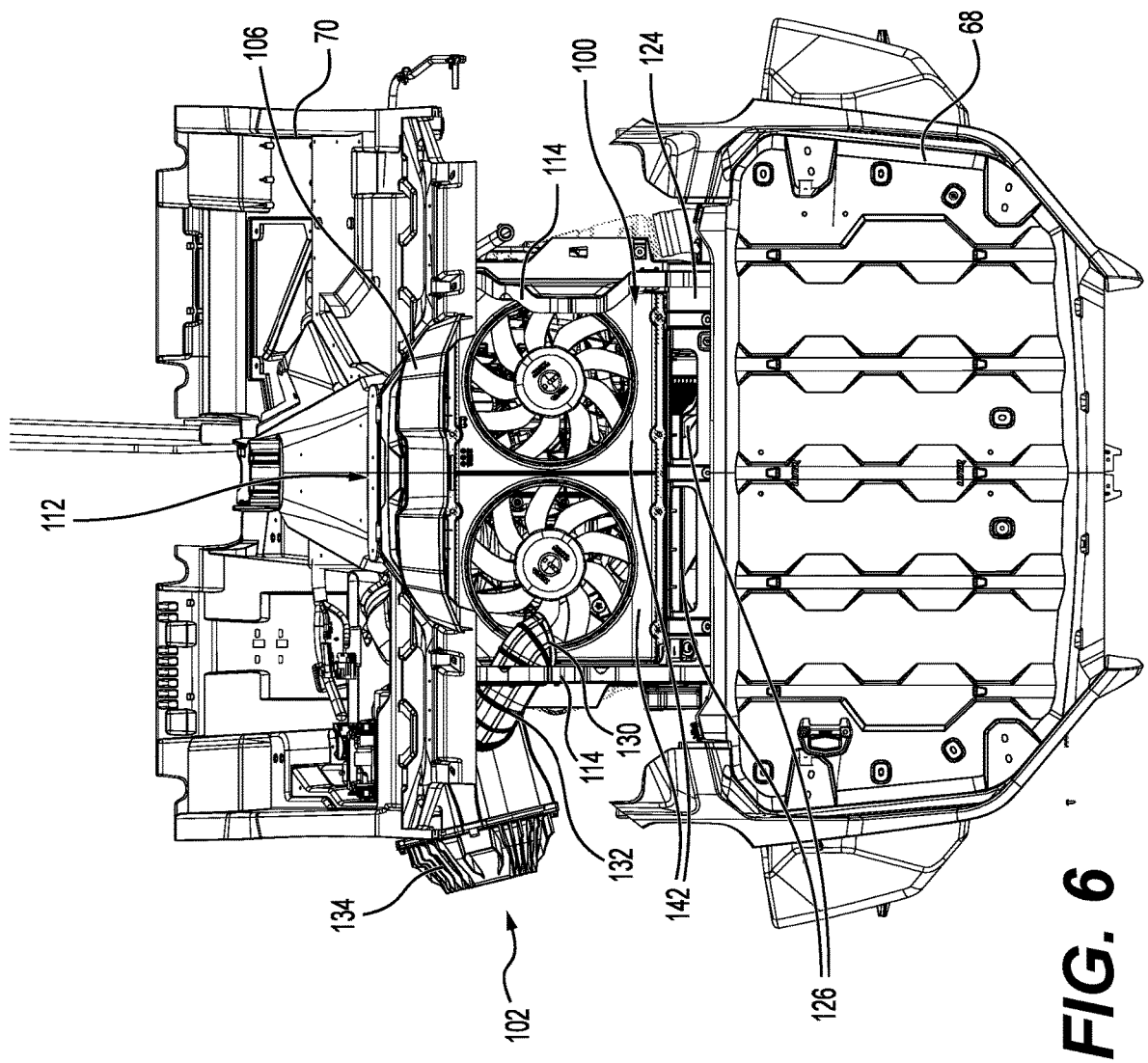
FIG. 6 is a top plan view of the components of FIG. 2 with a scoop and an intercooler removed.
Figure 7:
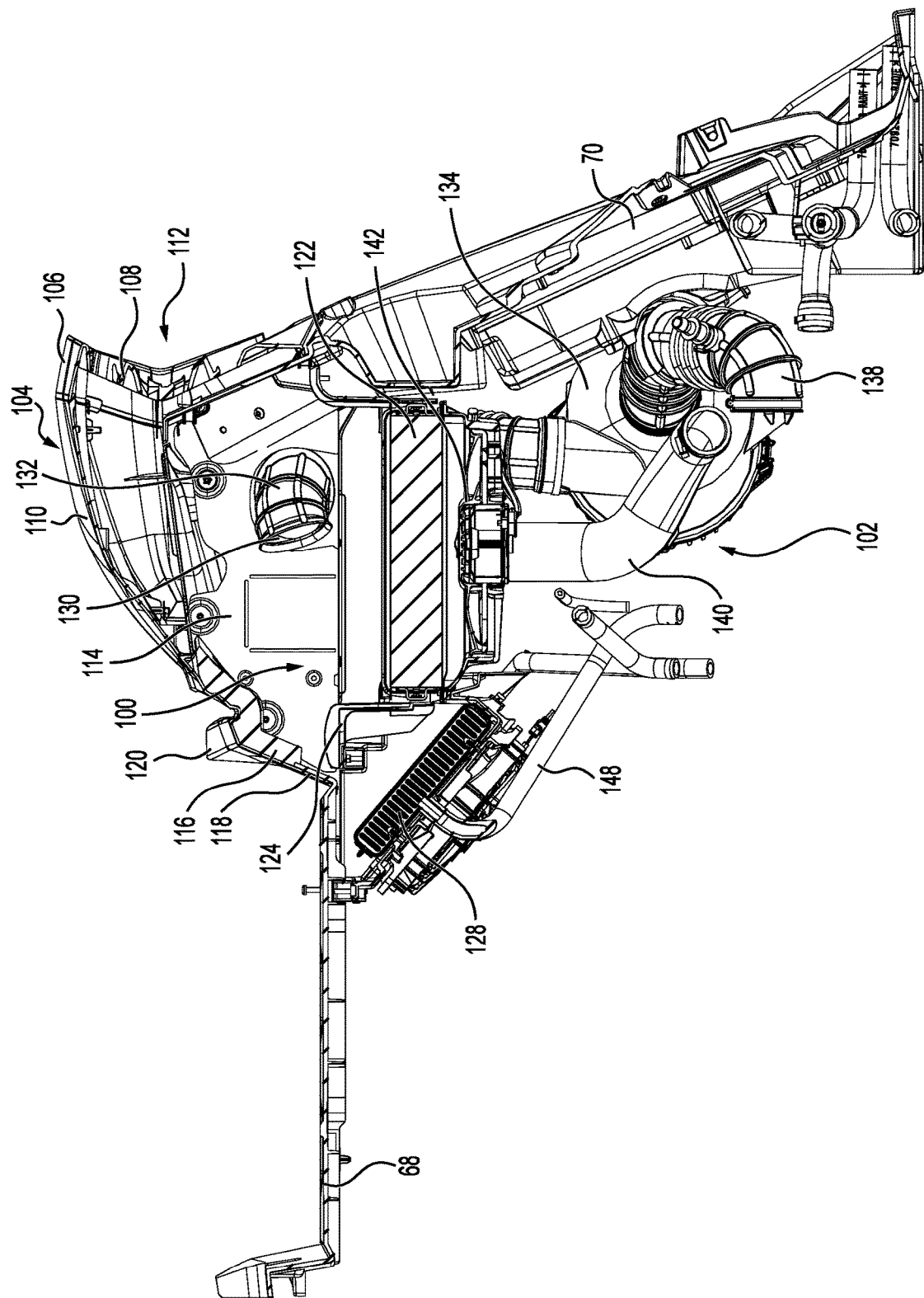
FIG. 7 is a longitudinal cross-section of the components of FIG. 2 taken along a line 7-7 of FIG. 3.
Figure 8:
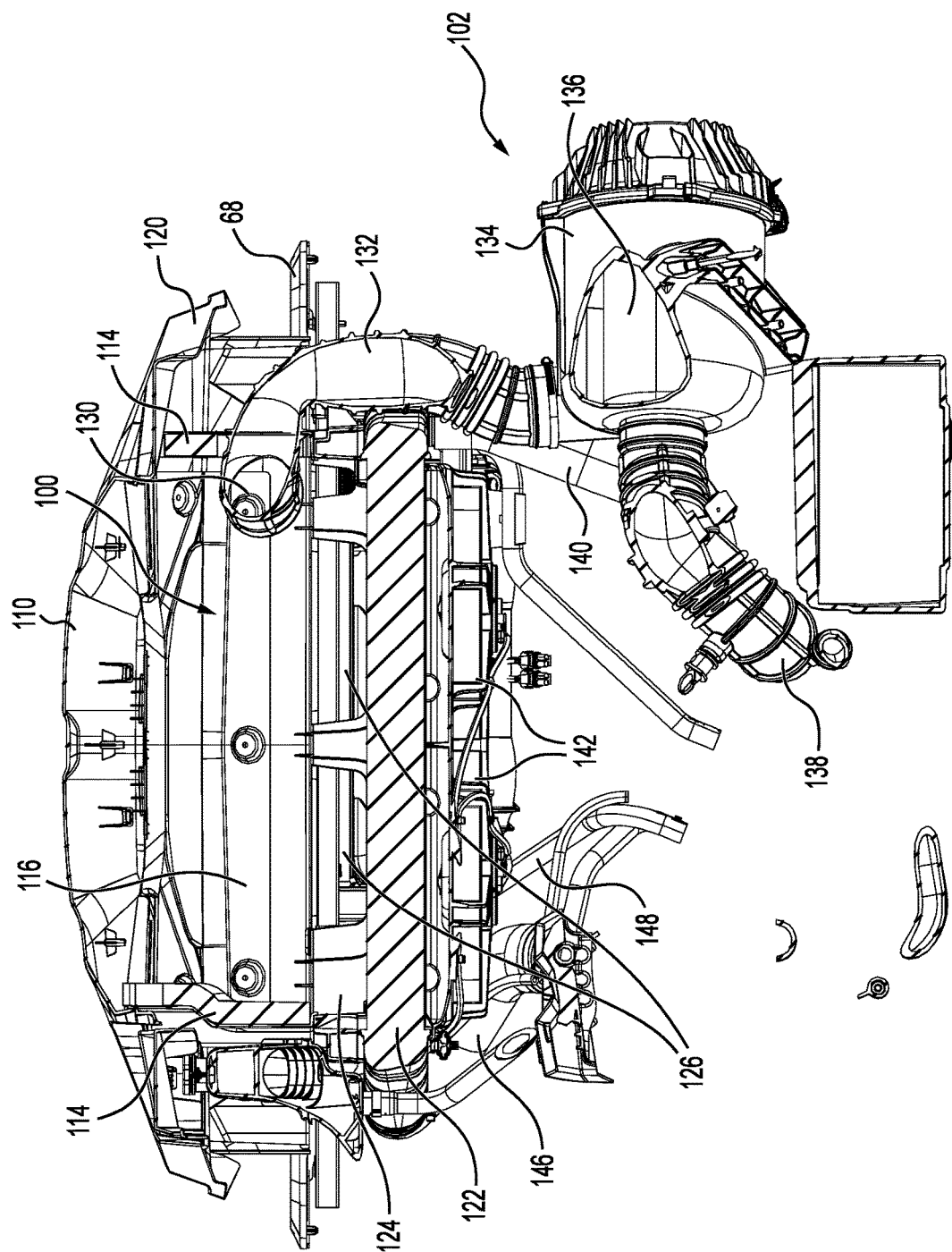
FIG. 8 is a lateral cross-section of the components of FIG. 2.
Figure 9:
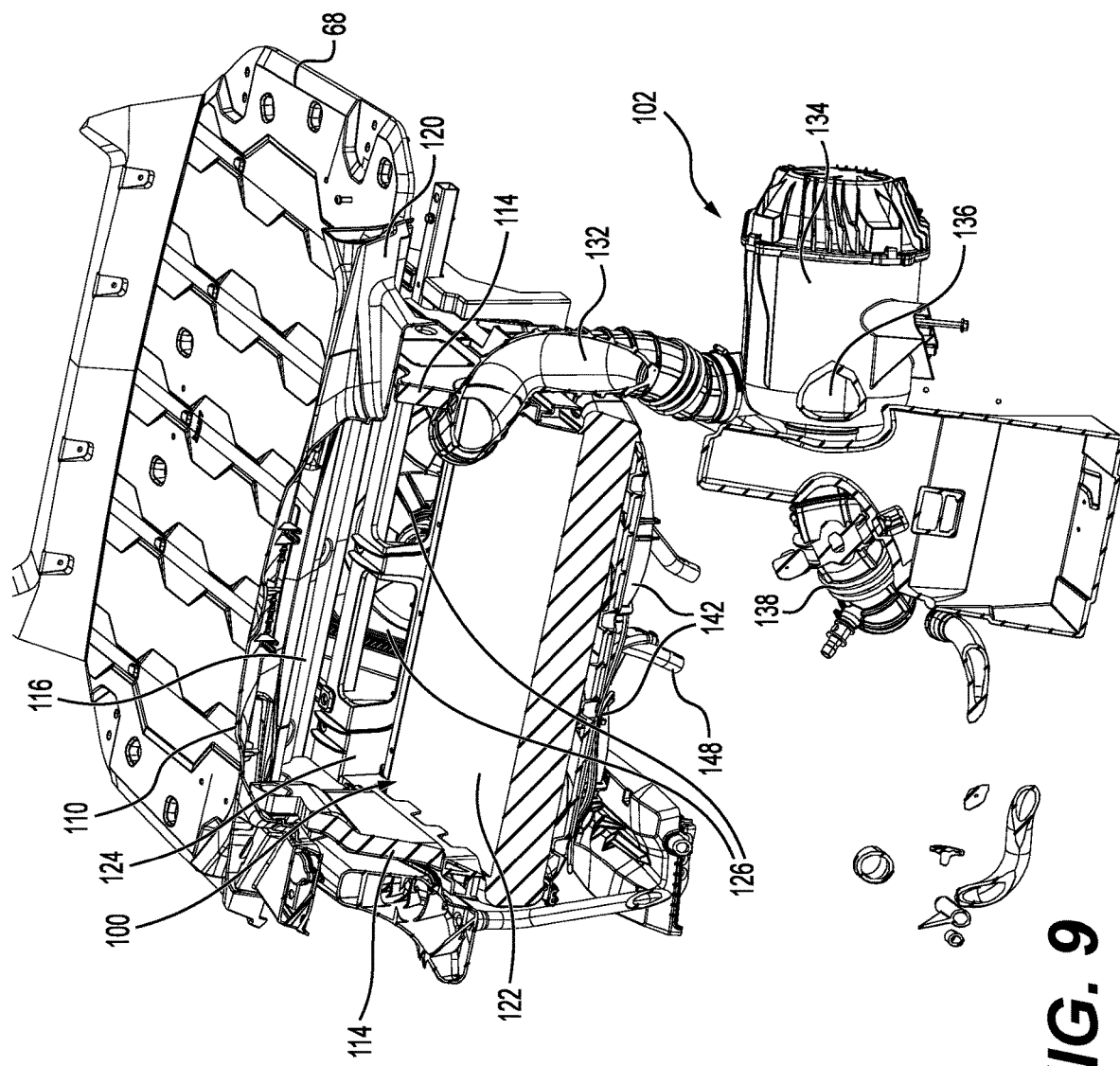
FIG. 9 is a perspective view taken from a front, left side of a lateral cross-section of the components of FIG. 2.

The engine air intake system 102 is fluidly connected to the engine 38 to supply air to the engine 38. More specifically, an inlet 130 of the engine air intake system 102 is disposed in the plenum 100 for supplying air from the plenum 100 to the engine 38. As best seen in FIGS. 5 to 7, the inlet 130 of the engine air intake system 102 faces generally rearward, downward and rightward. The inlet 130 is defined by a conduit 132. From the plenum 100, air flows into the conduit 132 which extends through the left plenum wall 114 and then downward and forward to enter through a top portion of an air filter housing 134 near a right end thereof as best seen in FIG. 8. The air filter housing 134 is generally cylindrical and contains an air filter 136 (shown in FIG. 8). The air filter housing 134 is rigidly connected to the wall 70. In some embodiments, it is contemplated that the conduit 132 could extend through the right plenum wall 114.

As best seen in FIG. 8, a conduit 138 extends right from a right end wall of the air filter housing 134. The right end of the conduit 134 is connected to a compressor side of the turbocharger 80 (FIG. 11) such that air can flow from the filter housing 134 to the turbocharger 80. The turbocharger 80 is disposed behind the cylinders of the engine 38. As explained above, the exhaust gases are supplied from the engine 38 to power a turbine of the turbocharger 80 that compresses the air supplied from the conduit 138 to the turbocharger 80. From the turbocharger compressed air enters a pipe 140 that extends rearward, upward and leftward and connects to a left side of the heat exchanger 122. In the present embodiment, the heat exchanger 122 is an intercooler 122 and the vehicle fluid it cools is the compressed air supplied from the turbocharger 80. The intercooler 122 includes passages for the flow of air coming from the pipe 140 for cooling the air that has previously been heated in the turbocharger 80. Two intercooler fans 142 are connected next to the intercooler 122, more specifically under the intercooler 122. The intercooler fans 142 draw air from the plenum 100 through the intercooler 122 based on conditions related at least in part on a position of a throttle valve (not shown) of a throttle body 144 (FIG. 10) and on engine speed. For example, the intercooler fans 142 may operate when the vehicle 10 is at rest or operating at low speed as the flow of air entering the plenum air intake 104 into the plenum 100 may be insufficient. As can be seen in FIG. 11, the intercooler fans 142 are disposed above the engine 38 and the turbocharger 80, such that air drawn by the intercooler fans 142 flows over the engine 38 and the turbocharger 80. As such, the intercooler fans 142 can be operated based on a temperature of the engine 38 and/or the turbocharger 80 to air cool these components independently of the requirements of the intercooler 122.

From the intercooler 122, air flows in a pipe 146 disposed on a right end of the intercooler 122 (see FIG. 5). The pipe 146 extends generally rearward, downward and leftward. From the pipe 146, air enters the throttle body 144 which includes a throttle valve (not shown) to control the flow of air to the engine 38. From the throttle body 144, the air enters an engine air intake plenum (not shown) extending next to the cylinders of the engine 38. From the engine air intake plenum, the air is supplied to the air intake ports of the engine 38.

With reference to FIGS. 4 to 11, in the present embodiment, the heat exchanger 128 forms part of a lubricant cooler. The heat exchanger 128 cools a coolant, in this embodiment a water/glycol mixture, that is used to cool transmission lubricant lubricating the transmission 50. More specifically, the heat exchanger 128 is a radiator 128, but other types of heat exchangers are contemplated. The water/glycol mixture flows between the transmission 50 and the radiator 128 via hoses 148 and is circulated by a pump (not shown). The radiator 128 includes passages for the flow of water/glycol mixture coming from the transmission 50 for cooling the water/glycol mixture. Two cooler fans 150 are connected next to the radiator 128, more specifically under the radiator 128. The cooler fans 150 draw air from the plenum 100 through the radiator 128 based on conditions related at least in part on a position of the throttle valve of the throttle body 144 and on engine speed. For example, the cooler fans 150 may operate when the vehicle 10 is at rest or operating at low speed as the flow of air entering the plenum air intake 104 into the plenum 100 may be insufficient. As can be seen in FIG. 11, the cooler fans 150 are oriented such that air drawn by the cooler fans 150 flows over the engine exhaust system, and more specifically over the muffler 86. As such, the cooler fans 150 can be operated based on a temperature of the muffler 86 and/or of the exhaust gases to air cool the muffler 86 and other components of the engine exhaust system independently of the requirements of the radiator 128.

As can be seen in FIG. 10, a heat exchanger 152, and more specifically a radiator 152, is used to cool engine coolant. The radiator 152 is disposed at a front of the vehicle 10. The radiator 152 is disposed behind the front panels 52 to receive air flowing therethrough. Coolant flows between the engine 38 and the radiator 152 via hoses 154 and is circulated by a pump (not shown). The radiator 152 includes passages for the flow of coolant coming from the engine 38 for cooling the coolant. A coolant cooler fan 156 is connected behind the radiator 152. The coolant cooler fan 156 draws air through the radiator 152 based on conditions related at least in part on a position of the throttle valve of the throttle body 144 and on engine speed.

It is contemplated that the heat exchangers 122, 128, 152 could be of a different type than the ones described above and/or that they could be used to cool a different vehicle fluid. For example, it is contemplated that the heat exchanger 122 could be used to cool engine coolant, the heat exchanger 128 could be used to cool the compressed air supplied from the turbocharger and the heat exchanger 152 could be used to cool transmission lubricant. The types of the heat exchangers 122, 128, 152 and their dimensions are determined at least in part by their required thermal performance and the type of vehicle fluid they cool. In an alternative embodiment, it is contemplated that the radiator 152 defines one of the plenum side walls 114 such that air from the plenum 100 flows over the radiator 152 to cool the engine coolant. In another alternative embodiment, the dimension of the intercooler 122 is reduced and the intercooler 122 and the radiator 152 are disposed side-by-side so as to define a bottom of the plenum 100.

Turning now to FIGS. 12 to 16, it can be seen that the vehicle 10 has been provided with a windshield 200 forward of the seats 24, 26. The windshield 200 is connected to the frame 12. More specifically, the windshield 200 is connected to the ROPS 72 via the roof 74 as will be described in more detail below. The windshield 200 protects occupants of the seats 24, 26 from wind and dust. However, the protection from the wind provided by the windshield 200 also reduces the supply of air to the plenum air intake 104. Although the engine 38 can still operate adequately when the windshield 200 is provided, in order to supply more air to the engine 38 and the heat exchangers 122, 128, the plenum air intake 104 is modified by providing it with an air intake conduit 202 which has a conduit inlet 204 located at a position that is vertically higher than the ROPS 72 and the roof 74 so as to be unobstructed by the windshield 200.

In the present embodiment, the plenum air intake 104 is modified by removing the scoop 110 and replacing is with an adapter 206. The adapter 206 has the same footprint as the scoop 110, and as such can connect to the bezel 106 and to the top of the plenum 100 in a similar manner. The adapter 206 has an aperture on a top thereof to which a lower end of the air intake conduit 202 connects. As such, a conduit outlet 208 of the air intake conduit 202 is disposed above the plenum 100 and is fluidly connected to the plenum 100 such that the air intake conduit 202 can supply air to the plenum 100. A plate 210 (FIGS. 15, 16) is provided behind the grille 108 of the plenum air intake 104 to block the inlet 112 of the plenum air intake 112 to prevent air entering the plenum 100 via the air intake conduit 202 from escaping via the inlet 112. An air deflector 212 (FIGS. 15, 16) is also provided in the plenum 100 below the conduit outlet 208. The air deflector 212 is angled such that a portion of air supplied from the conduit outlet 208 to the plenum 100 is deflected by the air deflector 212 toward the apertures 126 in the plenum 100, and therefore toward the heat exchanger 128. As can be seen in FIG. 16, the air deflector 212 is fastened to the adapter.

Figure 20:
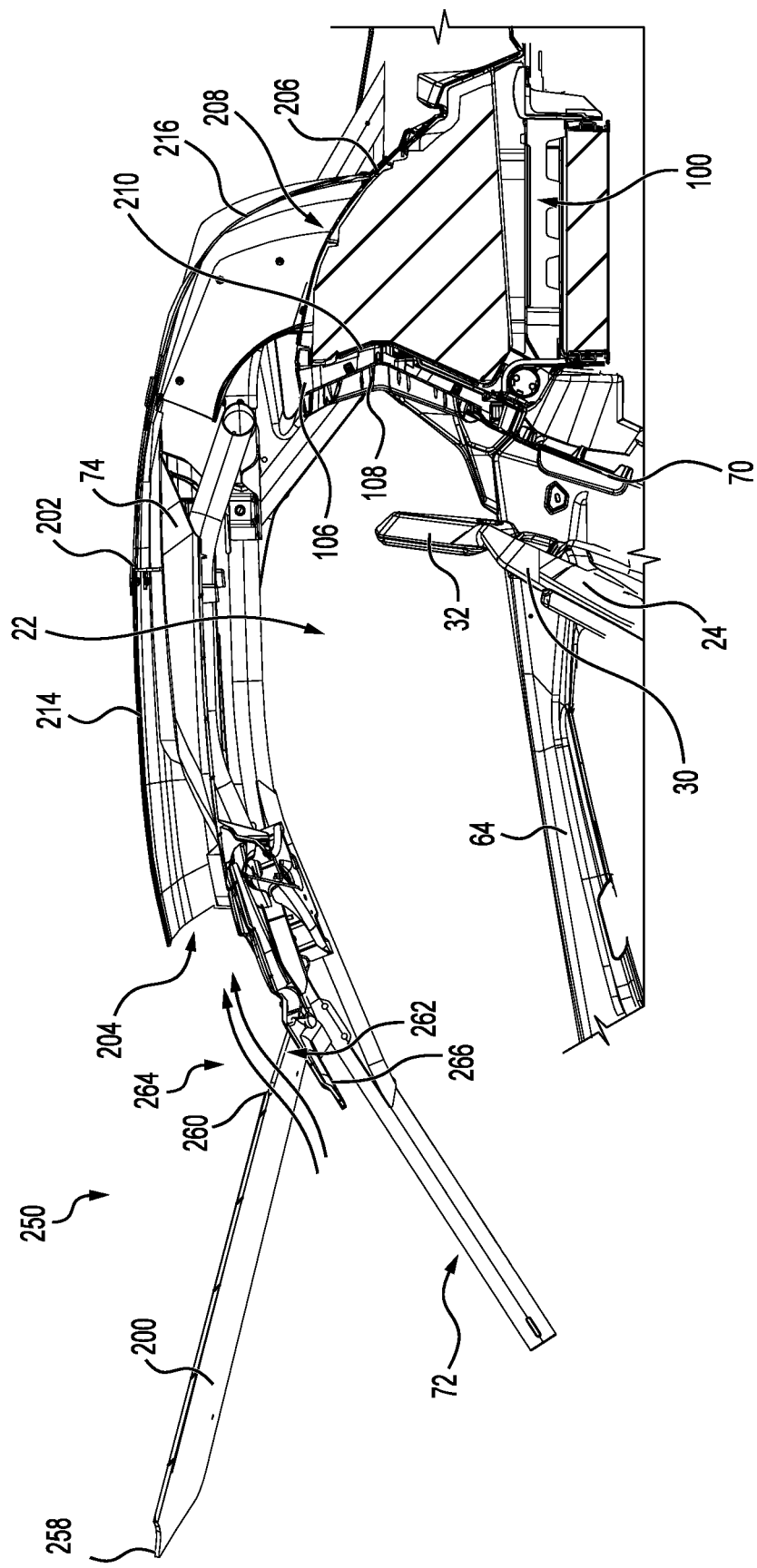
FIG. 20 is a longitudinal cross-section of an upper portion of the vehicle of FIG. 18.
Figure 21:
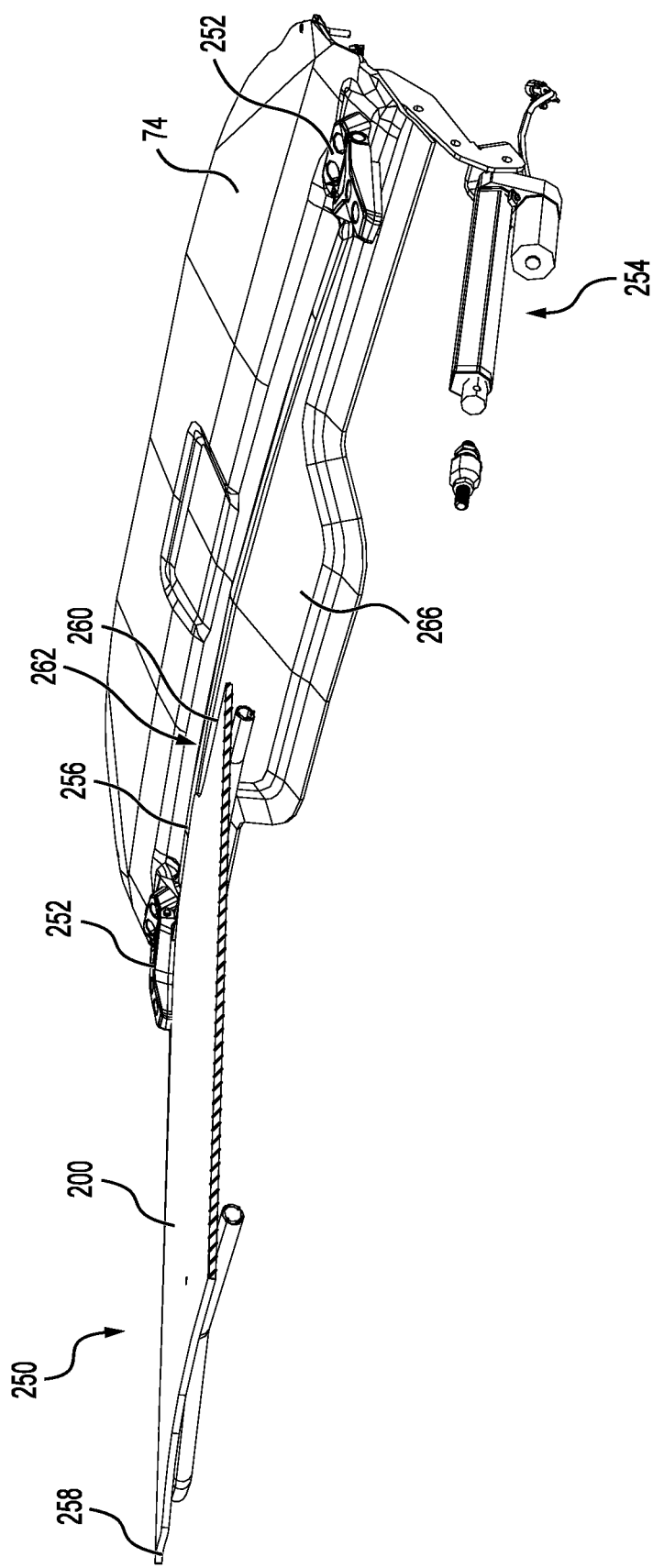
FIG. 21 is a perspective view taken from a front, left side of a partial longitudinal cross-section of the windshield and the roof of the vehicle of FIG. 18 with the windshield in the raised position.

As can be seen, the air intake conduit 202 is laterally centered on the vehicle 10 and is disposed laterally between the headrests 32 of the seats 24, 26. The air intake conduit 202 is generally L-shaped. The conduit inlet 204 faces generally forward and is disposed forward of the backrests 30 of the seats 24, 26 near a front of the roof 74. It is contemplated that the conduit inlet 204 could be disposed elsewhere, including positions that are to the left or right of the lateral center of the vehicle 10. The air intake conduit 202 has a portion 214 that extends generally horizontally rearward from the conduit inlet 204 above the roof 74. The air intake conduit 202 also has a portion 216 that extends generally upward from the conduit outlet 208 to connect to the rear end of the portion 214. As can be seen in FIGS. 13 and 20, the portion 216 of the air intake conduit 202 is disposed rearward of the backrests 30 of the seats 24, 26 and forward of the rear cargo platform 68.

Figure 15:
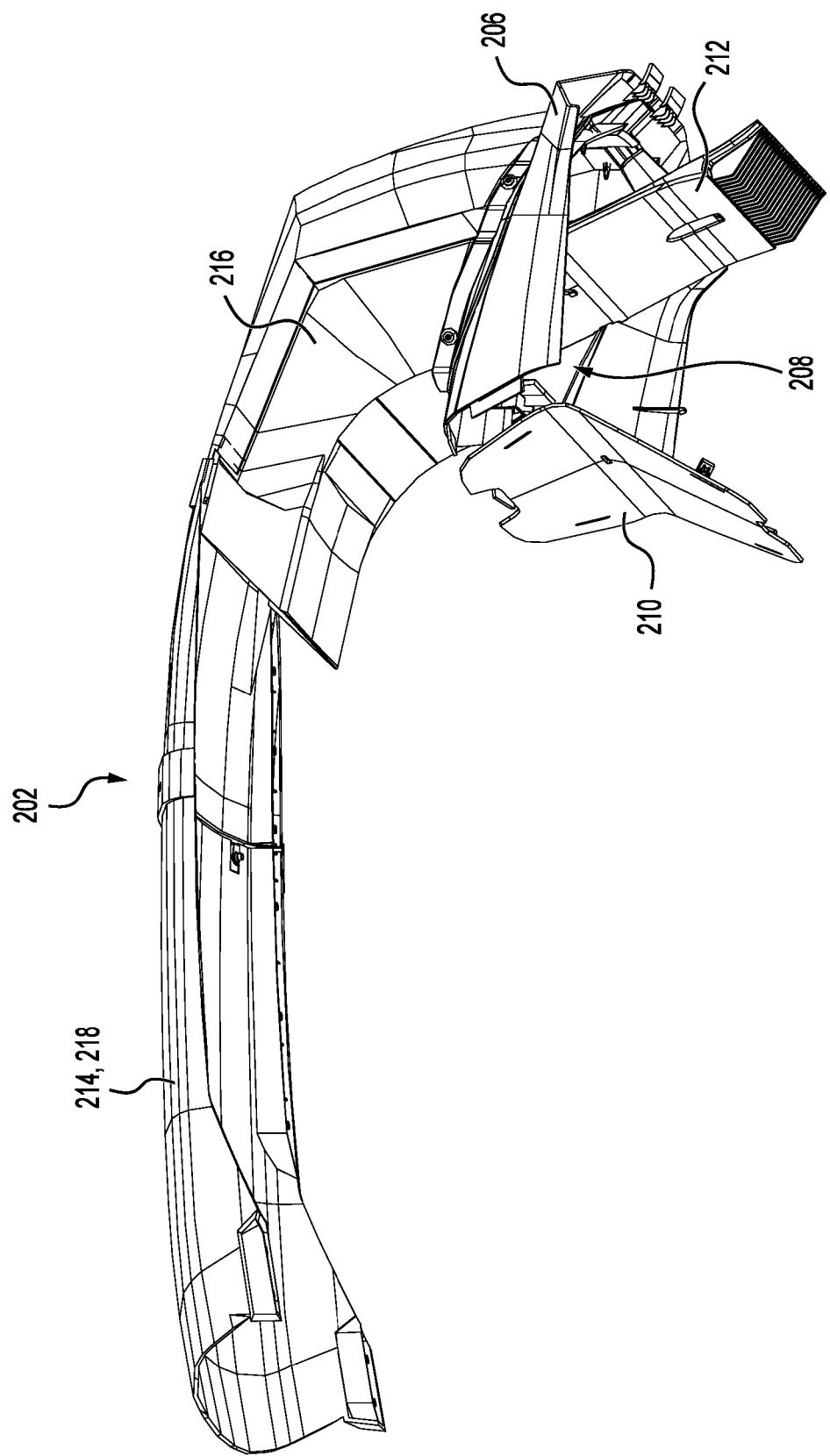
FIG. 15 is a perspective view taken from a bottom, front, left side of the air intake conduit of the vehicle of FIG. 12.
Figure 16:
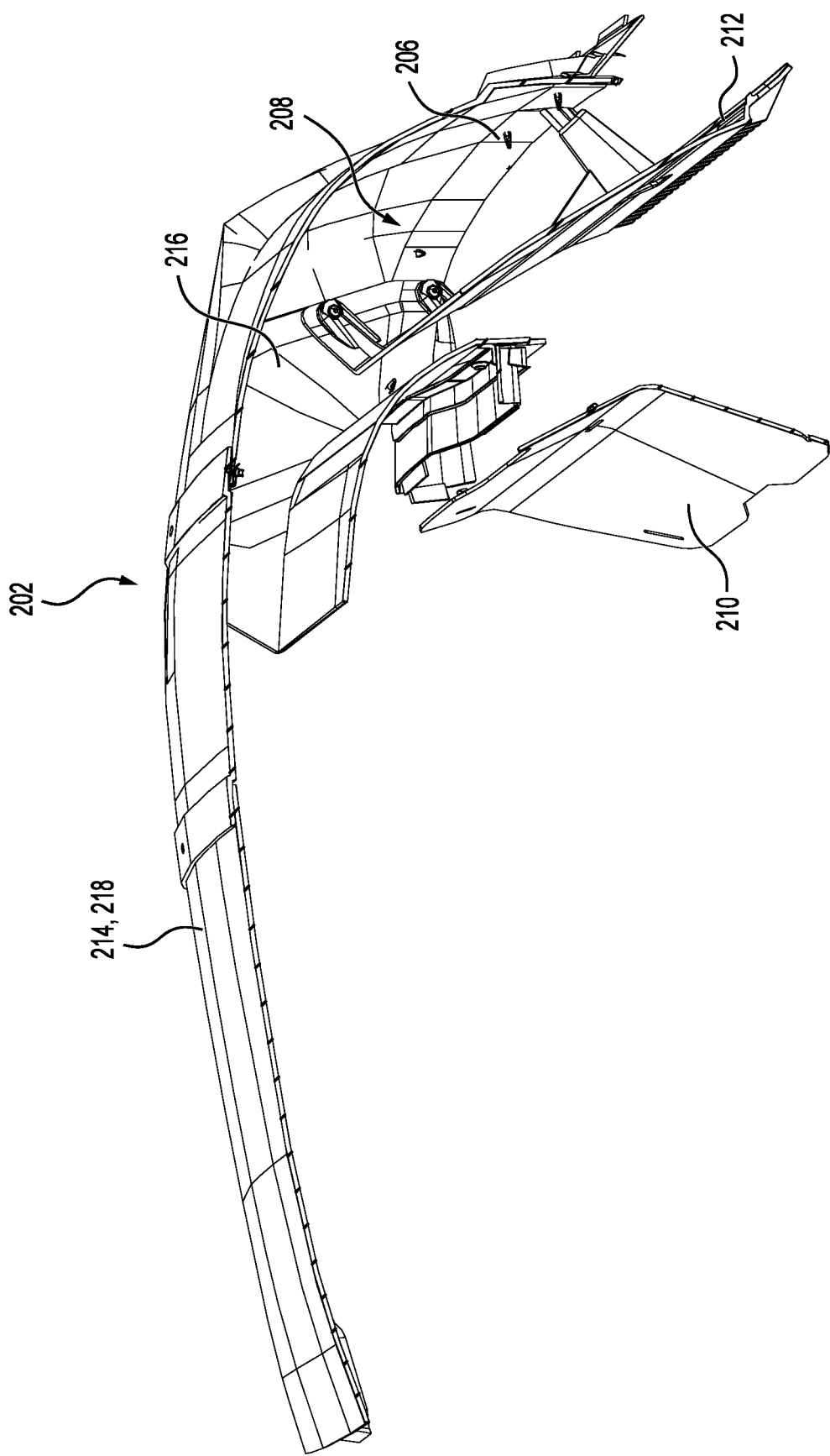
FIG. 16 is perspective view taken from a top, front, left side of a longitudinal cross-section of the air intake conduit of FIG. 15.
Figure 22:
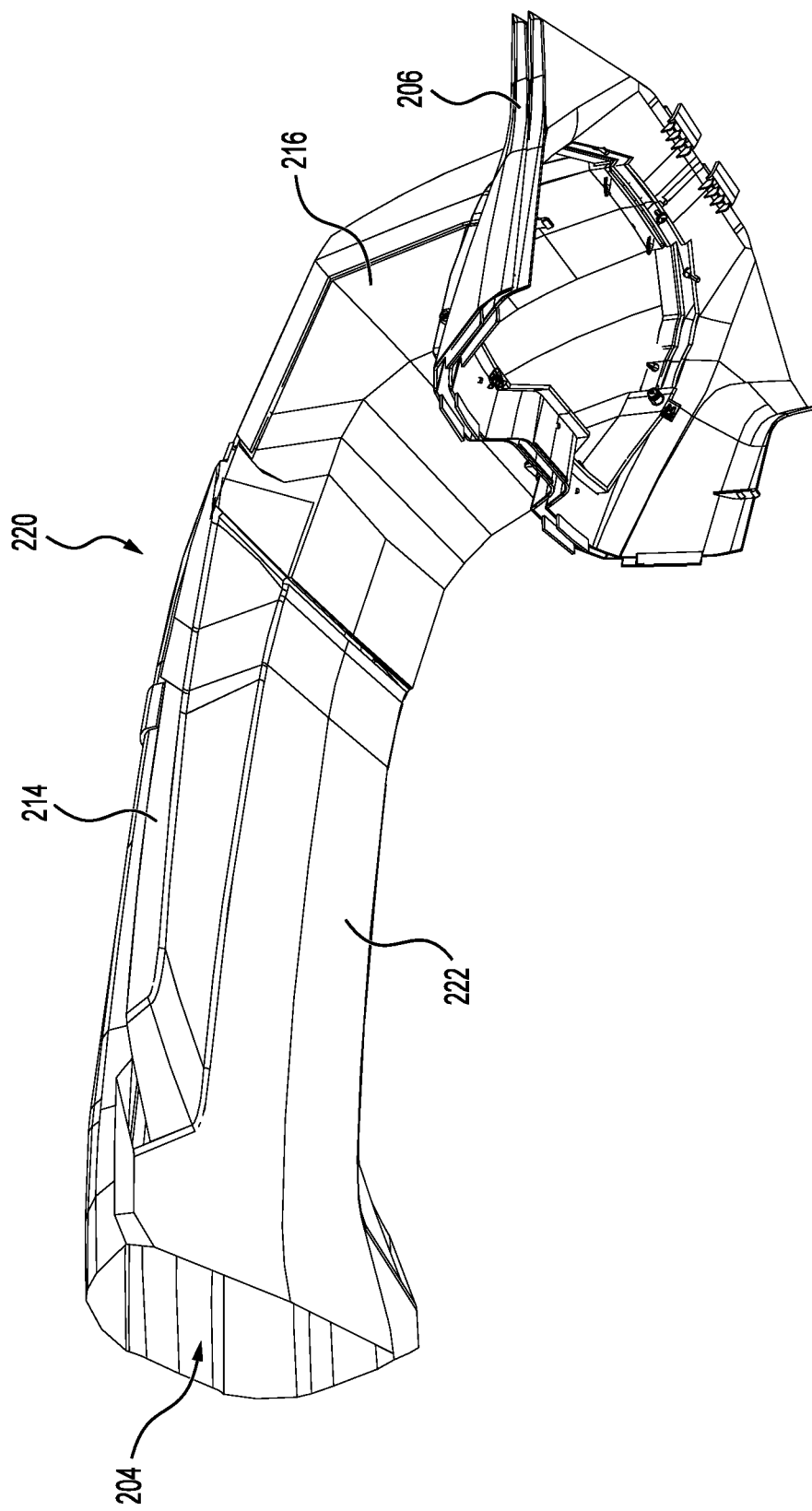
FIG. 22 is a perspective view taken from a bottom, front, left side of an alternative embodiment of an air intake conduit of the vehicle of FIG. 15.

As can be seen in FIGS. 15 and 16, the section of the air conduit 202 that includes the portion 214 is closed on the top, left and right sides by a channel 218 that is open at the bottom. The channel 218 rests on the roof 74 such that the bottom of this section is defined by the roof 74. In an embodiment of the vehicle 10 where the vehicle 10 is not provided by a roof 74, the air intake conduit 202 is replaced with an air intake conduit 220 (FIG. 22) where the channel 218 is replaced with a duct 222 that is closed on the top, bottom, left and right sides. The duct 222 is supported by the ROPS 72. It is contemplated that an air intake conduit similar to the air intake conduit 220 could be used with the vehicle 10 having the roof 74. In such an embodiment, the duct 222 rests on the roof 74.

It is contemplated that the air intake conduit 202 or 220 could be provided on the vehicle 10 even when the windshield 200 is not provided.

Turning now to FIGS. 12 and 17 to 21, a windshield assembly 250 will be described in more detail. The windshield assembly 250 includes the windshield 200, left and right hinges 252 and a gas cylinder 254.

The windshield 200 is made from a transparent material such as glass or polycarbonate for example. The windshield 200 is planar, but it is contemplated that it could be curved.

The left and right hinges 252 are connected to the a top portion of the windshield 200. The hinges 252 pivotally connect the windshield 200 to a front of the roof 74. As such, the windshield 200 is pivotally connected to the ROPS 72 via the roof 74 and the hinges 252. The hinges 252 allow the windshield 200 to pivot between a lowered position, shown in FIGS. 12 and 17, and a raised position, shown in FIGS. 18 to 21. In the lowered position, a top edge 256 of the windshield 200 is vertically higher than a lower edge 258 of the windshield 200. In the raised position, the lower edge 258 of the windshield 200 is vertically higher than the top edge 256 of the windshield 200. It is contemplated that in other embodiments, instead of pivoting, the windshield 200 could move in some other manner between a lowered and raised position, for example by translating. It is also contemplated that in some embodiments, the windshield 200 could not be moveable, but could still be removable.

The gas cylinder 254 is pivotally connected between the windshield 200 and the ROPS 72 on a left side of the windshield 200. The gas cylinder 254 supports the windshield in the raised position. It is contemplated that the gas cylinder 254 could be provided on a right side of the windshield 200, or that gas cylinders 254 could be provided on both sides of the windshield 200. It is contemplated that in some embodiments, the gas cylinder 254 could be replaced by, or form part of, a windshield power actuator which allows the user of the vehicle 10 to raise and lower the windshield 200 using buttons, a switch, or some other input device provided in the cockpit area 22. In such an embodiment, the windshield 200 could have other positions that are intermediate the illustrated raised and lowered positions.

As best seen in FIG. 20, when the windshield 200 is the raised position, the lower edge 258 of the windshield 200 is higher than the conduit inlet 204 of the air intake conduit 202. As such, the windshield 200 interferes with the flow of air to the conduit inlet 204 when the vehicle 10 is moving forward. However, in order to allow air to be supplied to the conduit inlet 204 when the windshield 200 is in the raised position, the windshield 200 defines a windshield recess 260 in its top edge 256. As can be seen in FIG. 20, in the raised position of the windshield 200, an air passage 262 is defined by the roof 74 and the windshield recess 260, and air flows through the air passage 262 to be supplied to the conduit inlet 204 as illustrated by arrows 264.

The windshield recess 260 is laterally centered on the windshield 200, and therefore on the vehicle 10. As such, the windshield recess 260 is also laterally aligned with the conduit inlet 204 and is disposed laterally between the left and right hinges 252. It is contemplated that the windshield recess 260 could have another position determined at least in part by the position of the conduit inlet 204. As can be seen in FIG. 20, in the raised position of the windshield 200, the windshield recess 260 is vertically lower than the conduit inlet 204.

Figure 17:
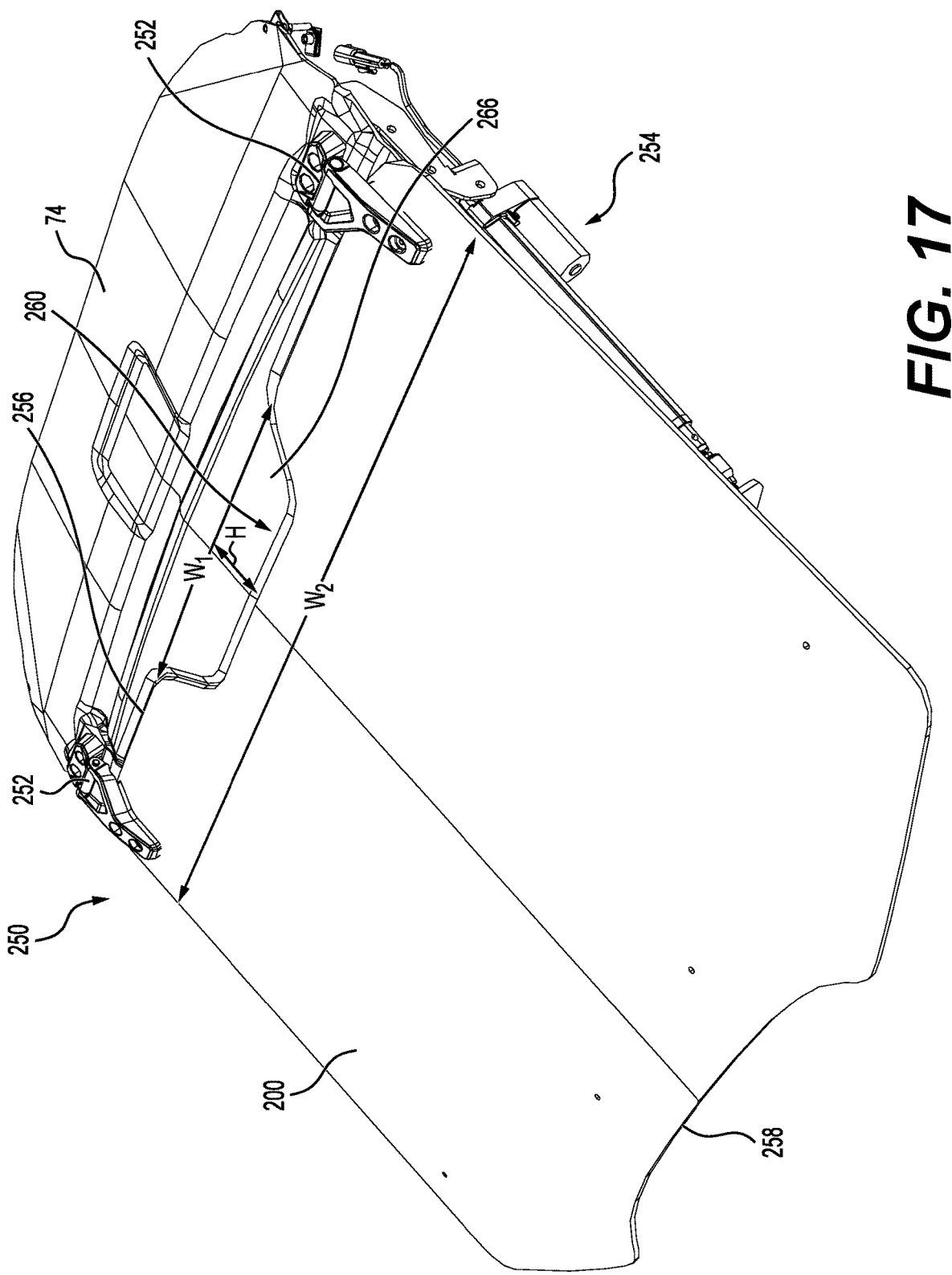
FIG. 17 is a perspective view taken from a front, left side of the windshield and a front portion of a roof of the vehicle of FIG. 12, with the windshield shown in a lowered position.
Figure 18:
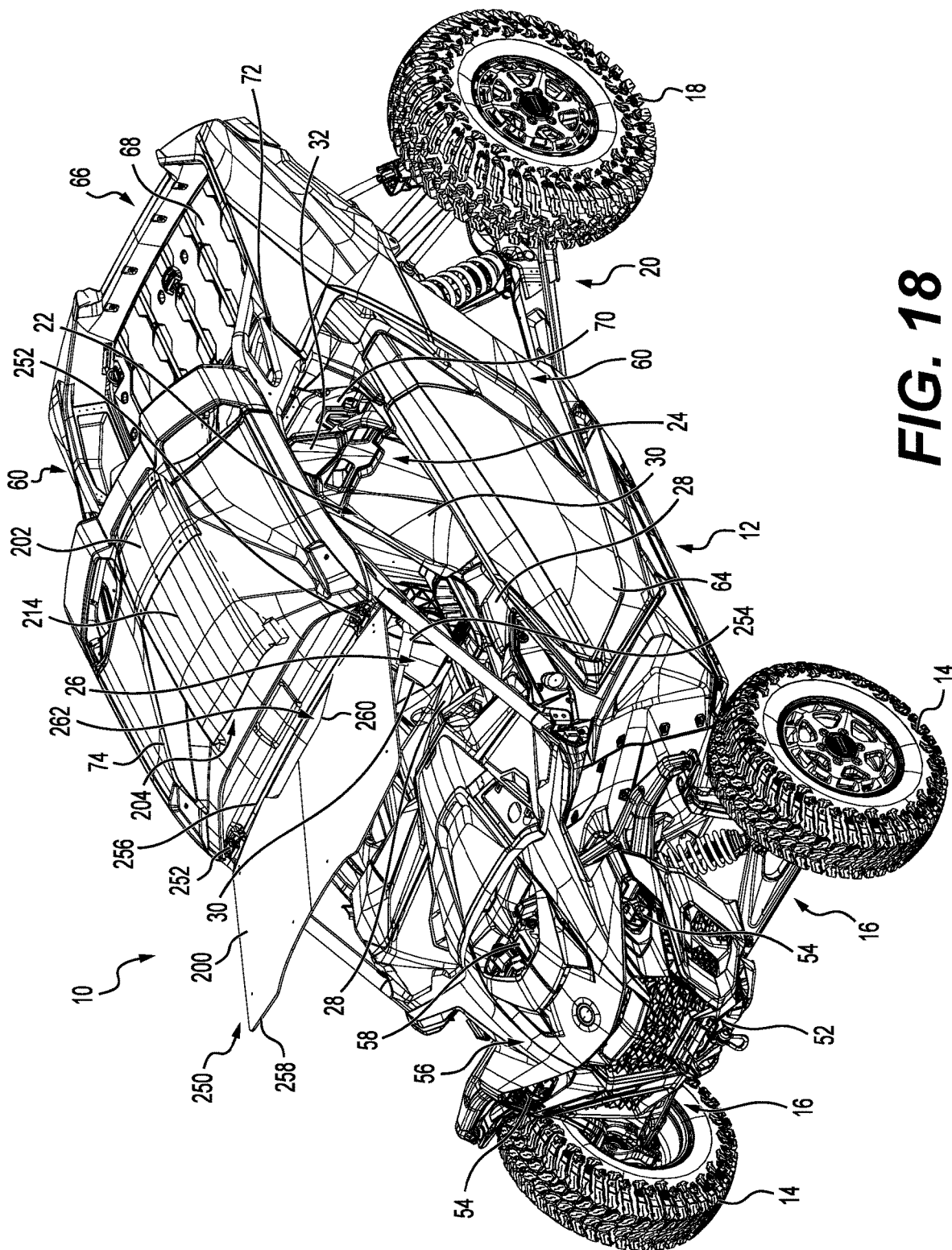
FIG. 18 is a perspective view taken from a front, left side of the vehicle of FIG. 12 with the windshield in a raised position.

The roof 74 has a portion 266 that protrudes from a front thereof. This portion 266 has a shape and size that are similarly to those of the windshield recess 260. When the windshield 200 is in the lowered position, the portion 266 of the roof 74 is received in the windshield recess 260 as can be seen in FIG. 17. As such, the portion 266 of the roof 74 prevents air from passing through the windshield recess 266 into the cockpit area 22 when the windshield is in the lowered position. The portion 266 also prevents the passage of dust, debris, rain and/or snow. It is contemplated that the portion 266 would not have to be received in the windshield recess 260, but could instead be aligned with the windshield recess 160 and abut the back of the windshield 200 to prevent the passage of air through the windshield recess 260 when the windshield 200 is in the lowered position. It is contemplated that the portion 266 of the roof 74 could be omitted and that another portion of the vehicle 10 could block the passage of air through the windshield recess 260 when the windshield 200 is in the lowered position.

The windshield recess 260 is configured and sized so as to permit a sufficient flow of air to the conduit inlet 204 when the vehicle 10 is moving forward with the windshield 200 in the raised position. In the present embodiment, the windshield recess 260 has left and right sloping sides that taper from an open end of the windshield recess 260 to the closed end of the windshield recess 260, but other shapes are contemplated. The windshield recess 260 is at least as wide and at least as high as the conduit inlet 204, but it is contemplated that in some embodiments the windshield recess 260 could be narrower and/or shorter than the conduit inlet 204. With reference to FIG. 17, in the present embodiment a maximum width $W_1$ of the windshield recess 260 is greater than a third of a maximum width $W_2$ of the windshield 200 and a height H of the windshield recess 260 is less than a quarter of the maximum width $W_1$ of the windshield recess 260. Other dimensions of the windshield recess 260 are contemplated. It is contemplated that the single windshield recess 260 could be replaced by a plurality of smaller windshield recesses. It is also contemplated that the windshield recess 260 could be replaced by one or more windshield apertures in the windshield 200. It is also contemplated that the windshield recess 260 could be replaced by a combination of smaller windshield recesses and windshield apertures.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. An off-road vehicle comprising:
a frame including a rollover protection structure,
a roof connected to the rollover protection structure;
two front wheels operatively connected to the frame;
two rear wheels operatively connected to the frame;
at least one seat supported by the frame;
an internal combustion engine supported by the frame, the internal combustion engine being disposed rearward of the at least one seat, the internal combustion engine being operatively connected to at least one of:
the two rear wheels; and
the two front wheels;
an engine air intake system fluidly connected to the engine for supplying air to the engine; and
an air intake conduit having a conduit inlet and a conduit outlet, the air intake conduit being generally L-shaped, the conduit outlet being fluidly connected to the engine air intake system for supplying air to the engine air intake system, the conduit inlet being disposed at least in part vertically higher than the rollover protection structure, the conduit inlet facing generally forwardly, the conduit inlet being disposed forward of a backrest of the at least one seat,
a first portion of the air intake conduit extending generally horizontally rearward from the conduit inlet,
a second portion of the air conduit extending generally upward from the conduit outlet, the second portion being disposed at least in part rearward of the backrest of the at least one seat,
a portion of the air intake conduit being vertically higher than the roof.

2. The vehicle of claim 1, further comprising a windshield connected to the frame forward of the at least one seat.

3. The vehicle of claim 1, wherein the roof defines a bottom of a section of the air intake conduit comprising the portion of the air intake conduit that is vertically higher than the roof.

4. The vehicle of claim 1, further comprising a rear cargo platform connected to the frame and being disposed rearward of the at least one seat;
wherein the air intake conduit is disposed forward of the rear cargo platform.

5. The vehicle of claim 1, further comprising a plenum disposed rearward of the at least one seat;
wherein:
an inlet of the engine air intake system being disposed in the plenum for supplying air from the plenum to the engine; and
the conduit outlet being fluidly connected to the plenum for supplying air to the engine air intake system.

6. The vehicle of claim 5, wherein the conduit outlet is disposed above the plenum.

7. The vehicle of claim 5, further comprising:
a heat exchanger supported by the frame; and
an air deflector disposed at least in part in the plenum, a portion of air supplied from the conduit outlet to the plenum being deflected by the air deflector toward the heat exchanger.

8. The vehicle of claim 5, wherein the plenum is laterally centered on the vehicle.

9. The vehicle of claim 5, wherein the engine is disposed under the plenum.

10. The vehicle of claim 1, wherein:
the at least one seat is two seats disposed side-by-side;
each of the two seats has a headrest; and
the air intake conduit is disposed laterally between the headrests.

11. The vehicle of claim 4, wherein the internal combustion engine is disposed at least partially under the rear cargo platform.

* * * * *